（12) United States Patent
Vivod et al.

(10) Patent No.: US 10,800,883 B1
(45) Date of Patent: Oct. 13, 2020

(54) OPTICALLY TRANSPARENT POLYIMIDE AEROGELS

(71) Applicant: United States of Americas as represented by the Administrator of NASA, Washington, DC (US)

(72) Inventors: Stephanie L. Vivod, Euclid, OH (US); Mary Ann B. Meador, Strongsville, OH (US); Andrew Shinko, Cleveland, OH (US); Sadan C. Jana, Cleveland, OH (US); Coleen Pugh, Cleveland, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 171 days.

(21) Appl. No.: 15/787,906

(22) Filed: Oct. 19, 2017

Related U.S. Application Data

(60) Provisional application No. 62/411,139, filed on Oct. 21, 2016.

(51) Int. Cl.
 C08G 73/14 (2006.01)
 C08J 9/12 (2006.01)
 C08G 73/12 (2006.01)

(52) U.S. Cl.
 CPC .............. *C08G 73/14* (2013.01); *C08J 9/122* (2013.01); *C08G 73/122* (2013.01); *C08J 2201/026* (2013.01); *C08J 2203/06* (2013.01); *C08J 2203/08* (2013.01); *C08J 2205/026* (2013.01);
(Continued)

(58) Field of Classification Search
 CPC .............................. C08G 73/14; C08G 73/122
 See application file for complete search history.

(56) References Cited

U.S. PATENT DOCUMENTS

| 7,691,912 B2 | 4/2010 | Ou et al. |
| 8,552,076 B2 | 10/2013 | Cho |
| 8,974,903 B2 | 3/2015 | Meador et al. |

(Continued)

OTHER PUBLICATIONS

Polyimide Aerogels with Amide Cross-Links: A Low Cost Alternative for Mechanically Strong Polymer Aerogels. Mary Ann B. Meador, Christian R. Alemán, Katrina Hanson, Nakaira Ramirez, Stephanie L. Vivod, Nathan Wilmoth, and Linda McCorkle. ACS Applied Materials & Interfaces 2015 7 (2), 1240-1249.*

(Continued)

*Primary Examiner* — Michael M Dollinger
*Assistant Examiner* — Christina H. W. Rosebach
(74) *Attorney, Agent, or Firm* — Robert H. Earp, III; Mark Wolfgang; Helen M. Galus

(57) ABSTRACT

Processes and precursors may be used to produce a highly porous, extremely large surface area polyimide aerogel with optical translucency and diminished heat transfer. The resulting material maintains or exceeds structural integrity and low thermal conductivity seen in the high opacity polyimide aerogels of similar porosity and density. The formulations used for fabrication of aerogels may include combinations of fluorinated dianhydride and diamine fractions and non-fluorinated dianhydrides and diamines with various aliphatic and aromatic bridgehead components as precursors to the condensation polymerization of polyimide aerogels with polyamide crosslinks.

17 Claims, 20 Drawing Sheets

(52) U.S. Cl.
CPC ........ *C08J 2205/05* (2013.01); *C08J 2379/08* (2013.01)

(56) References Cited

U.S. PATENT DOCUMENTS

| | | |
|---|---|---|
| 9,434,832 B1 | 9/2016 | Meador |
| 9,540,495 B2 | 1/2017 | Attie |
| 9,593,206 B2 | 3/2017 | White et al. |
| 2006/0246806 A1 | 11/2006 | Rhine et al. |
| 2009/0029147 A1 | 1/2009 | Tang et al. |

OTHER PUBLICATIONS

Dielectric and Other Properties of Polyimide Aerogels Containing Fluorinated Blocks. Mary Ann B. Meador, Emily McMillon, Anna Sandberg, Elizabeth Barrios, Nathan G. Wilmoth, Carl H. Mueller, and Félix A. Miranda. ACS Applied Materials & Interfaces 2014 6 (9), 6062-6068 (Year: 2014).*

Shinko, A. (2015). Structure and Morphology Control in Polymer Aerogels with Low Crosslink Density. (Electronic Thesis or Dissertation). (Year: 2015).*

Andrew Shinko, Sadhan C. Jana, and Mary Ann Meador, "Crosslinked Polyurea Aerogels with Controlled Porosity," RSC Adv., 5, 105329-105338 (2015).

Andrew Shinko, "Structure and Morphology Control in Polymer Aerogels with Low Crosslink Density;" PhD. Dissertation, The University of Akron (2015).

S. Ando, T. Matsura, and S. Nishi, "13C NMR Analysis of Fluorinated Polyimides and Poly (amic Acid)s," Polymer, vol. 33, Issue 14, pp. 2934-2939 (1992).

Mary Ann B. Meador, C.R. Aleman, K. Hanson, N. Ramirez, Stephanie L. Vivod, N. Wilmoth, and L. McCorkle, "Polyimide Aerogels with Amide Cross-Links: A Low Cost Alternative for Mechanically Strong Polymer Aerogels," ACS Appl. Mater. Interfaces, vol. 7, No. 2, pp. 1240-1249 (Jan. 2015).

* cited by examiner

FIG. 2A
Dianhydrides
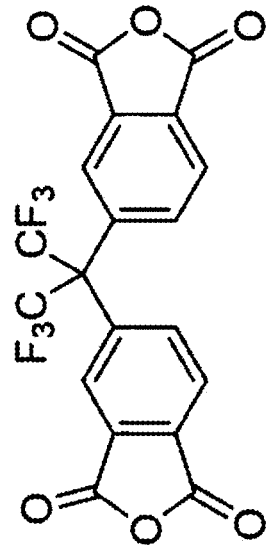
4,4'-(Hexafluoroisopropylidene) diphthalic anhydride (6FDA)
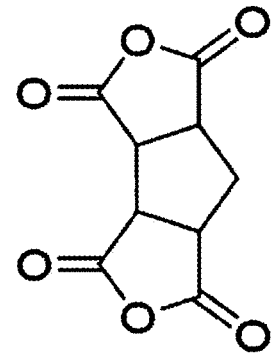
1,2,3,4-Cyclopentane tetracarboxylic dianhydride (CPDA)
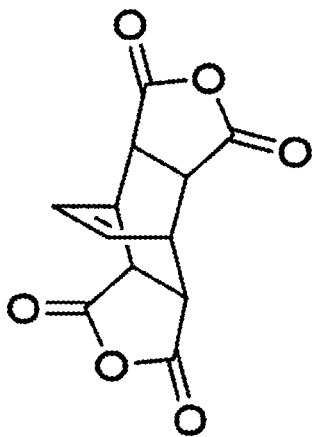
Bicyclo[2.2.2]oct-7-ene-2,3,5,6-tetracarboxylic dianhydride (BCDA)
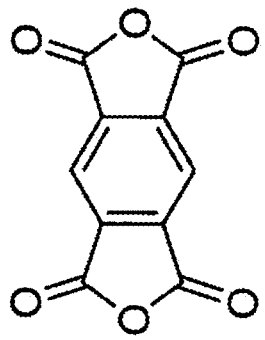
Pyromellitic dianhyride (PMDA)
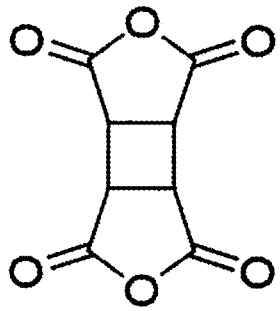
Cyclobutane-1,2,3,4-tetracarboxylic dianhydride (CBDA)
200

FIG. 2B
Diamines
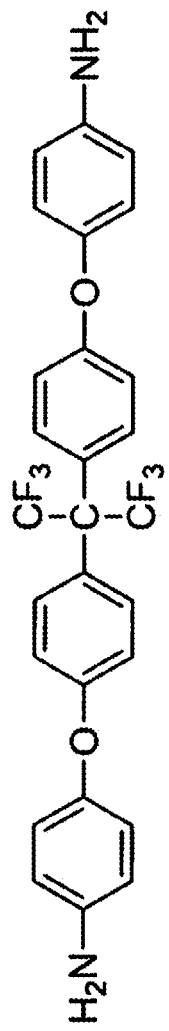
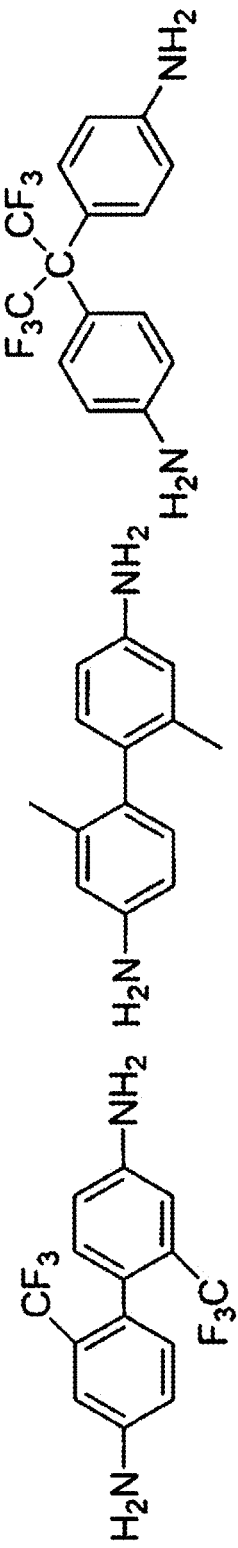
2,2'-Bis[4-(4-aminophenoxy phenyl)] hexafluoropropane (HFBAPP)
2,2'-Bis(4-aminophenyl) hexafluoropropane (Bis-A-AF)
2,2'-Dimethylbenzidine (DMBZ)
2,2'-Bis(trifluoromethyl) benzidine (22TFMB)

FIG. 2C
Crosslinkers for Amine End-Capped Oligomers
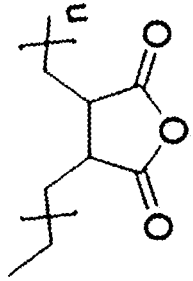
Poly(ethylene maleic anhydride) (PEMA)
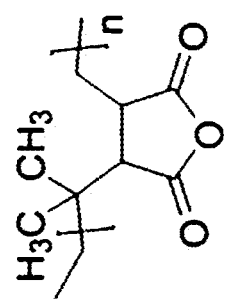
Poly(isobutylene maleic anhydride) (PIMA)
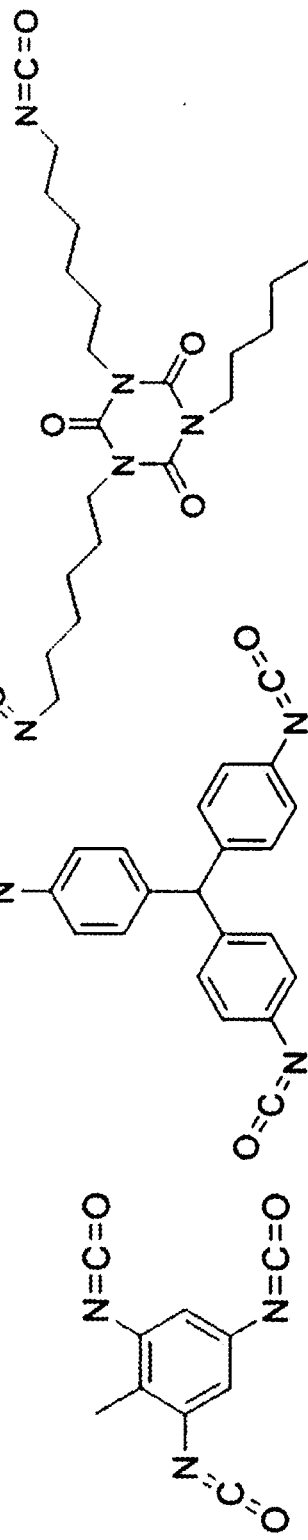
DESMODUR® N 3300A
Methylidynetri-p-phenylene triisocyanate (MTPT)
1,3,5-Benzenetricarbonyl trichloride (BTC)
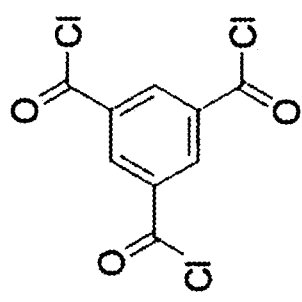
Toluene-2,4,6-triyl triisocyanate (TTTC)
220

Crosslinkers for Anhydride End-Capped Oligomers

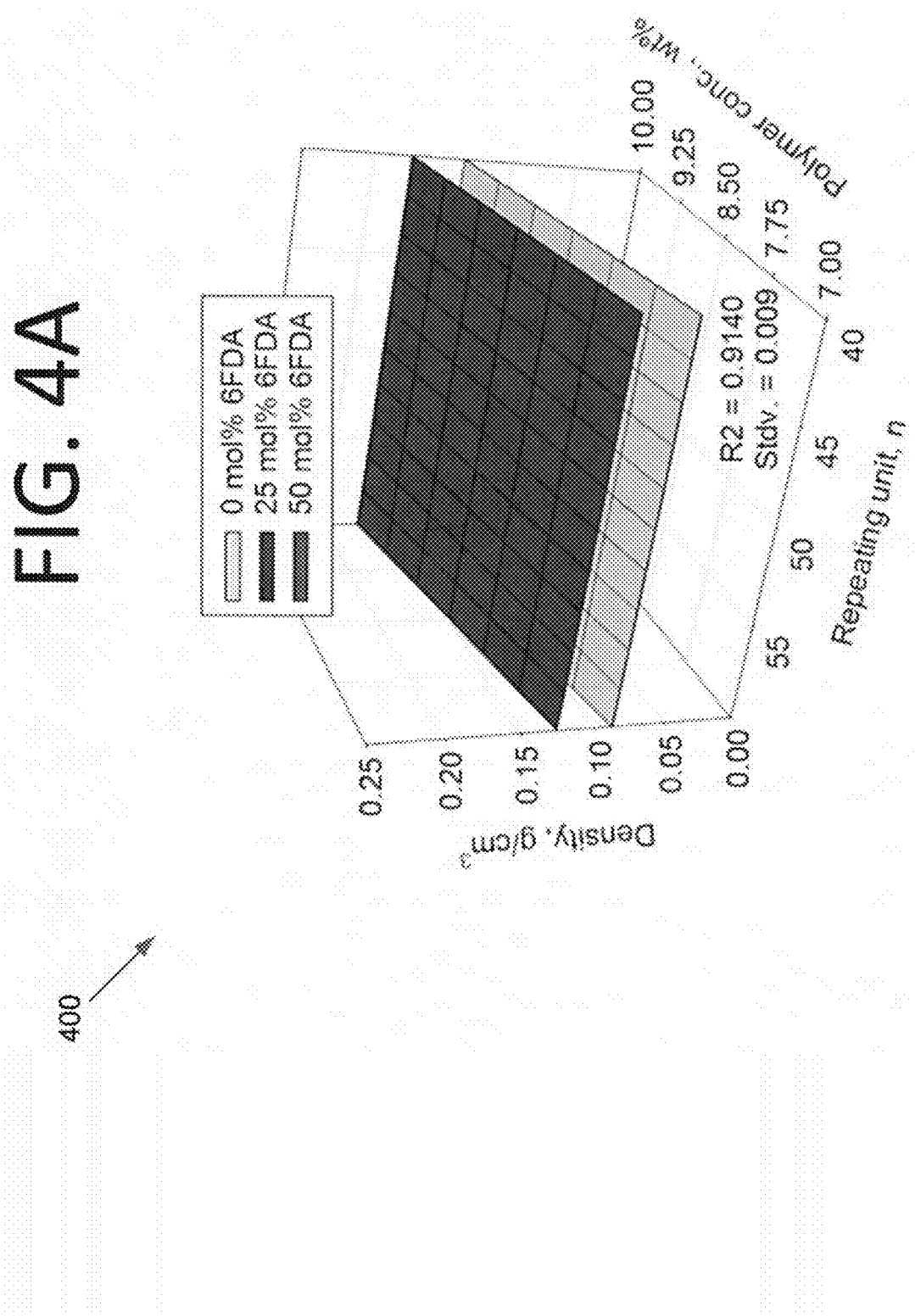

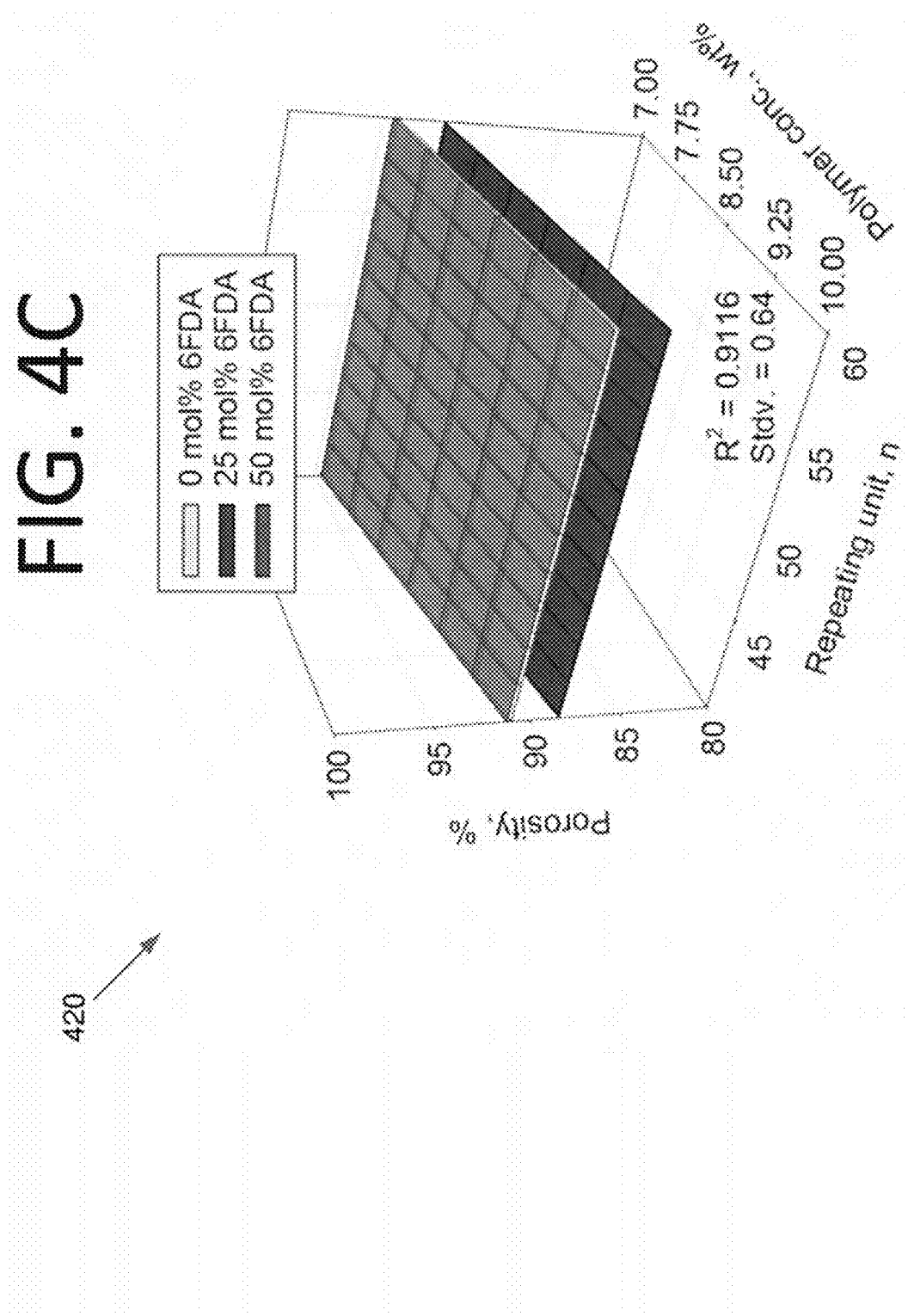

FIG. 6
0% 6FDA
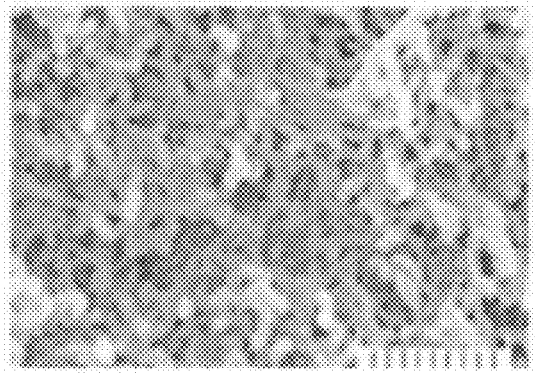 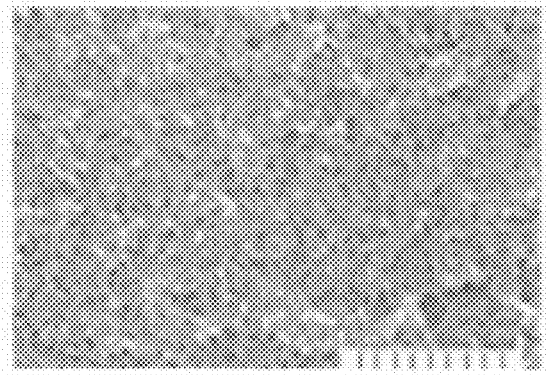
density = 0.137 g/cm$^3$, porosity = 91%, surface area = 669 m$^2$/g
25% 6FDA
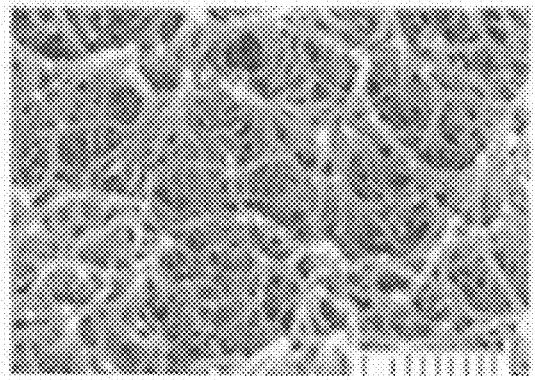 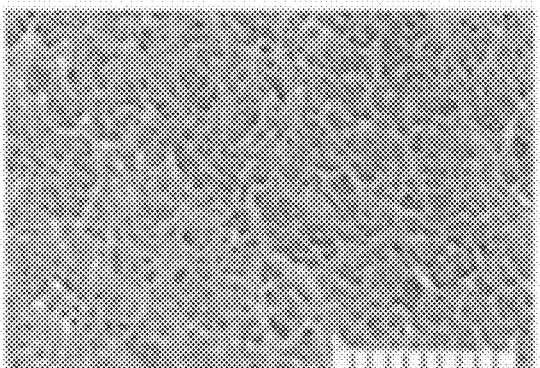
density = 0.167 g/cm$^3$, porosity = 89%, surface area = 769 m$^2$/g
50% 6FDA
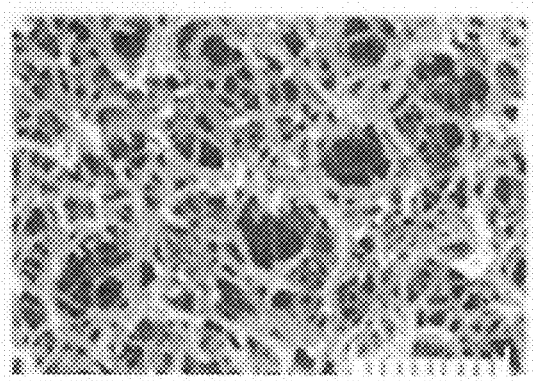 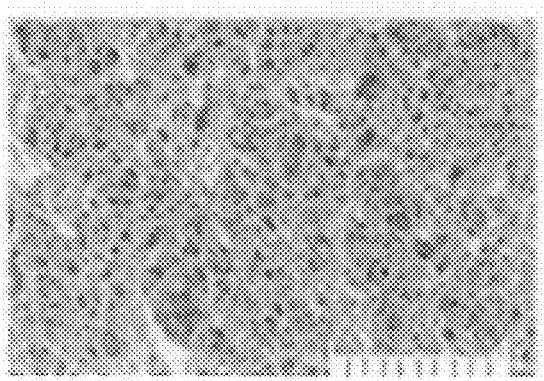
density = 0.139 g/cm$^3$, porosity = 91%, surface area = 605 m$^2$/g

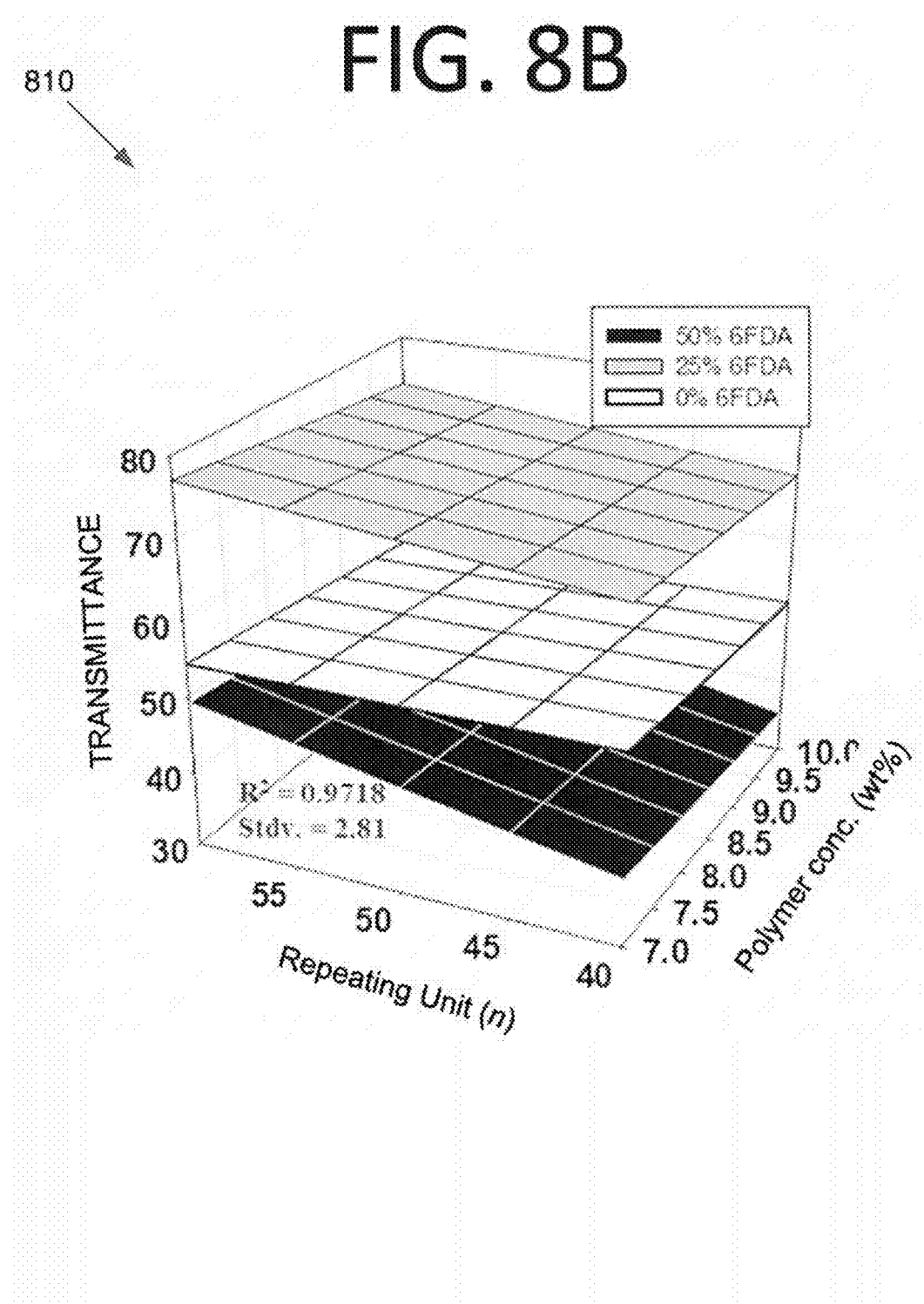

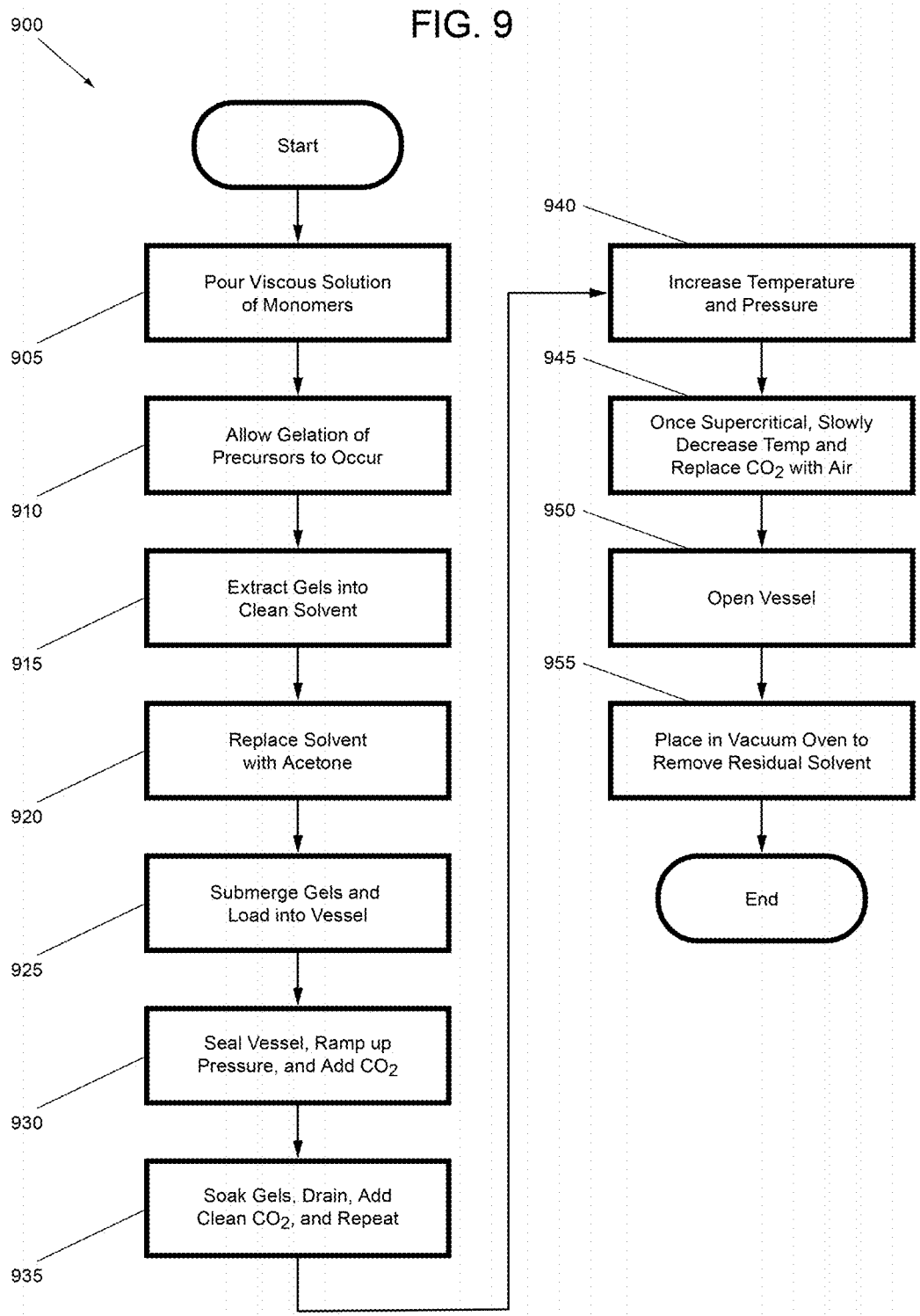

OPTICALLY TRANSPARENT POLYIMIDE AEROGELS

CROSS REFERENCE TO RELATED APPLICATION

This application claims the benefit of U.S. Provisional Patent Application Ser. No. 62/411,139 filed on Oct. 21, 2016. The subject matter of this earlier-filed application is hereby incorporated by reference in its entirety.

ORIGIN OF THE INVENTION

The invention described herein was made by employees of the United States Government and may be manufactured and used by or for the Government for Government purposes without the payment of any royalties thereon or therefore.

FIELD

The present invention generally pertains to aerogels, and more particularly, to optically transparent polyimide aerogels.

BACKGROUND

Day lighting capabilities, such as windows or glass blocks, have had little improvement in regard to low thermal conductivity and are most commonly made from fragile materials, such as silica. Although transparent, the inherent fragility of silica-based aerogels limits the scope of applications for these materials. Polymer aerogel research has expanded greatly due to the enhanced structural integrity over typical silica aerogels.

Incorporation of a polymer with the silica enhances structural integrity, but sacrifices transparency. The current state-of-the-art polyimide aerogels are robust with properties that make them ideal for advanced insulation applications for extreme environments. In addition, unlike polymer coated silica aerogels, they can be film cast and display multiple levels of flexibility. However, applications for current materials are limited to composite structures or linings in environments where optical transparency is not necessary. Accordingly, an improved polymer aerogel and process for making the same may be beneficial in expanding the function and application base.

SUMMARY

Certain embodiments of the present invention may be implemented and provide solutions to the problems and needs in the art that have not yet been fully solved by conventional aerogels and aerogel technologies. For example, some embodiments of the present invention pertain to processes and precursors used to produce a highly porous, extremely large surface area polyimide aerogel with optical translucency and diminished heat transfer. The resulting material of some embodiments maintains or exceeds structural integrity and low thermal conductivity seen in the high opacity polyimide aerogels of similar porosity and density.

In an embodiment, a porous polyimide aerogel includes a polyimide oligomer component including a reaction product of at least one dianhydride, a multifunctional crosslinker connected to the polyimide component, and at least one diamine. A ratio of the at least one dianhydride to the at least one diamine is n to n+1, respectively, where n is a number of repeat units in the polyimide oligomer. The porous polyimide aerogel is optically semi-transparent or transparent.

In another embodiment, a porous polyimide aerogel includes a plurality of dianhydrides including a fluorinated dianhydride and a non-fluorinated dianhydride. The porous polyimide aerogel also includes at least one diamine and a crosslinker that provides a bond to a polyimide backbone and encourages gelation. The porous polyimide aerogel is optically semi-transparent or transparent.

In yet another embodiment, a crosslinked polyimide polyamide includes a plurality of dianhydrides comprising 4,4'-Hexafluoroisopropylidene diphthalic anhydride (6FDA) and pyromellitic dianhydride (PMDA). The crosslinked polyimide polyamide also includes at least one diamine and a triacid chloride crosslinker including 1, 3, 5-benzenetricarbonyl trichloride (BTC) that provides an amide bond to a polyimide backbone and encourages gelation. The crosslinked polyimide polyamide is optically semi-transparent or transparent.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2A illustrates dianhydrides that may be used, in part, to create polyimide aerogels, according to an embodiment of the present invention.

FIG. 2B illustrates diamines that may be used, in part, to create polyimide aerogels, according to an embodiment of the present invention.

FIG. 2C illustrates crosslinkers that may be used to react with amine end-capped oligomers used, in part, to create polyimide aerogels, according to an embodiment of the present invention.

FIGS. 4A-C illustrate empirical models comparing density, shrinkage, and porosity in relation to number of repeat units (n) and polymer concentration (wt %) of polyimide aerogel at varying fractions of 6FDA and PMDA with DMBZ, according to an embodiment of the present invention.

FIG. 6 illustrates scanning electron microscope (SEM) images at varying 6FDA and PMDA concentration and magnification, according to an embodiment of the present invention.

FIGS. 8A-C illustrate graphs comparing the effect of the degree of polymerization (n) and concentration of polymer (w/w %) on the clarity, transmission, and haze of polyimide aerogels at varying concentrations of 6FDA, according to an embodiment of the present invention.

FIG. 9 is a flowchart illustrating a process for creating transparent or semi-transparent polyimide aerogels, according to an embodiment of the present invention.

DETAILED DESCRIPTION OF THE EMBODIMENTS

Figure 1A:
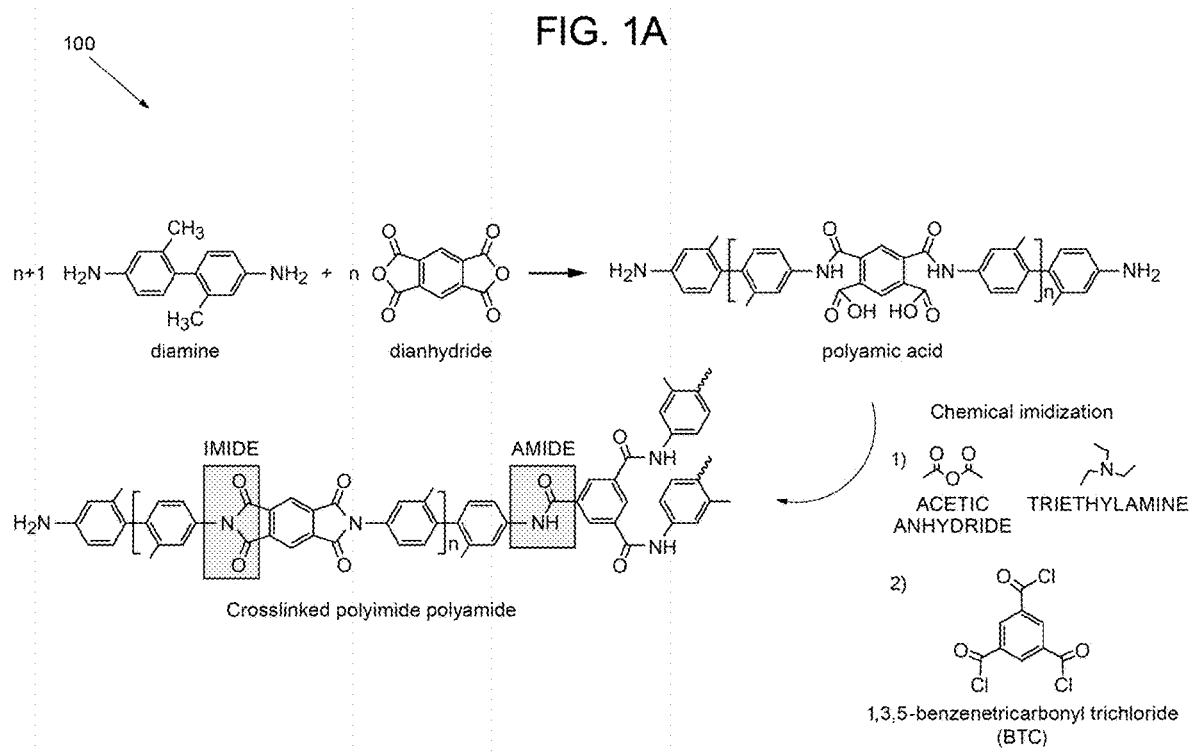
FIG. 1A illustrates a representation of amine end-capped polyamic acid formation followed by chemical imidization and addition of trifunctional crosslinker resulting in a polyimide chain with a polyamide crosslink, according to an embodiment of the present invention.

Some embodiments of the present invention pertain to processes and precursors used to produce a highly porous, extremely large surface area polyimide aerogel with optical translucency and diminished heat transfer. The resulting material of some embodiments maintains or exceeds structural integrity and low thermal conductivity seen in the high opacity polyimide aerogels of similar porosity and density. The formulations used for fabrication of aerogels in some embodiments include combinations of fluorinated dianhydride and diamine fractions and non-fluorinated dianhydrides and diamines with various aliphatic and aromatic bridgehead components as precursors to the condensation polymerization of polyimide aerogels with polyamide crosslinks.

Formulations were synthesized using three variables: chain length, monomer fraction, and polymer concentration, allowing the results to be analyzed in relation to one another. Varying the length of the repeat unit (n) from n=40 to 60 provides the ability to tune the crosslink density. The formulations also varied either the dianhydride fraction (Pyromellitic dianhydride (PMDA), 4, 4'-Hexafluoroisopropylidene diphthalic anhydride (6FDA), Cyclobutane-1,2,3,4-tetracarboxylic dianhydride (CBDA), Bicyclo [2.2.2]oct-7-ene-2,3,5,6-tetracarboxylic dianhydride (BCDA), and 1,2,3,4-Cyclopentane tetracarboxylic dianhydride (CPDA)) or the diamine fraction (2,2'-Dimethylbenzidine (DMBZ), 2,2'-Bis (trifluoromethyl) benzidine (22TFMB), 2,2-Bis (4-aminophenyl) hexafluoropropane (Bis-A-AF), and 2,2-Bis [4-(4-aminophenoxy phenyl)] hexafluoropropane (HFBAPP)) at respective ratios of 0/100, 25/75, and 50/50 using a fluorinated and non-fluorinated monomer with the same end functionality. The type of crosslinker with varied functionality including, but not limited to, 1, 3, 5-benzenetricarbonyl trichloride (BTC), poly(isobutylene maleic anhydride) (PIMA), polyethylene maleic anhydride (PEMA), toluene-2,4,6-triyltriisocyanate (TTTC), methylidnetri-p-phenylene triisocyanate (MTPT), DESMODUR® N3300 A, octa (aminophenyl)polysilsesquioxane (OAPS) and tris-1,3,5-aminophenoxy benzene (TAB). These functionalities are responsible for the imide, amide, and urea bonding between polymer chains and encouraging gelation. The type of crosslinker will dictate whether the polymer chain will be amine or anhydride end-capped, which also determines the order of addition for polymerization and crosslinking. The final aerogels were produced by supercritical fluid extraction using liquid $CO_2$ in order to maintain the desired three-dimensional structure without pore collapse. These combinations create polyimide aerogels with improved optical translucency, higher surface area, diminished thermal transfer, and flexibility.

Polyimides are exceptional materials often found in aeronautic and aerospace applications due to their ability to retain their physical and mechanical properties in thermally and chemically demanding environments. Polyimides are also among the most successful polymers used as components for microelectronics, optoelectronics, and other advanced optical applications. Optical polymers (OPs) are a preferred alternative to optical glasses for applications that require light weight, high impact resistance, and integration of components within the plastic itself. Crosslinked polyimide aerogel is a structural monolith of polyimide with many additional attributes, such as high porosity, low density, low dielectric constant, and low thermal conductivity. These characteristics make polymer aerogels ideal lightweight materials with good structural integrity for use in extreme environments. In addition, the high surface area and narrow range of pore sizes in the polyimide aerogels made with PMDA and 6FDA may lend to tunable properties such as optical transmittance, clarity, haze, refractive indices, and dielectric constants, finding use in wide fields of optical fabrications.

Gel formation is a result of varying monomer stoichiometry of dianhydrides, diamines, and multifunctional crosslinkers in polar aprotic solvents, such as n-methyl-2-pyrrolidone (NMP). The characteristic properties of the three-dimensional structures formed through gelation show a wide range of dependency on polymer concentration, monomeric structure, and concentration, as well as crosslink density. Previous work by Shinko et al. examined the physical effects of combining various dianhydrides and diamines using a triamine crosslinker. See Andrew Shinko, Sadhan C. Jana, and Mary Ann Meador, "Crosslinked Polyurea Aerogels with Controlled Porosity," RSC Adv., 5, 105329-105338 (2015); see also Andrew Shinko, "Structure and Morphology Control in Polymer Aerogels with Low Crosslink Density," PhD. Dissertation, The University of Akron (2015). This study demonstrated that using PMDA in the backbone produced highly transparent aerogels with large surface areas, while DMBZ gave aerogels that shrank less. The combination of these two monomers gave a product with blended character of lower shrinkage with higher optical translucency.

With these results in mind, aerogels were fabricated using PMDA and DMBZ, but cross-linked with 1,3,5-benzenetricarbonyl trichloride (BTC), as seen in representation 100 of FIG. 1. The use of this trifunctional monomer requires a different stoichiometry and synthetic route than when using a triamine crosslinker (as was done previously by Shinko et al.). In addition to the change in procedure, the use of BTC also creates a polyamide crosslink with the polyimide backbone. As opposed to end-capping with a dianhydride when using a triamine crosslinker, the use of BTC requires the polymer chain to contain amine endcaps in order to react with the triacid chloride. Also, the imidization of the polymer chain must be performed prior to the addition of the crosslinker in order to avoid reaction of the acid chloride with the amic acid, which would interfere with ring closure in order to form the polyimide.

FIG. 1A depicts the synthetic mechanism of polyimide formation 100 with a polyamide crosslink using reactants at a ratio of n+1 diamine and n dianhydride at varying weight percent. These monomers are dispersed in a high boiling point, aprotic solvent (such as NMP) to form a polyamic acid chain end-capped with amines. These chains were then imidized chemically at room temperature using a water scavenger (acetic anhydride) and a base catalyst (triethylamine) as dehydrating agents to close the ring of the amic acid forming the polyimide through a condensation polymerization, whereby 2n moles of water are produced. The purpose of the amine end-cap now becomes apparent, whereby the polyimide chain is then able to form cross-links by addition of the trifunctional monomer (1, 3, 5-benzenetricarbonyl trichloride (BTC)), creating amide bonds to the polyimide backbone.

Figure 1B:
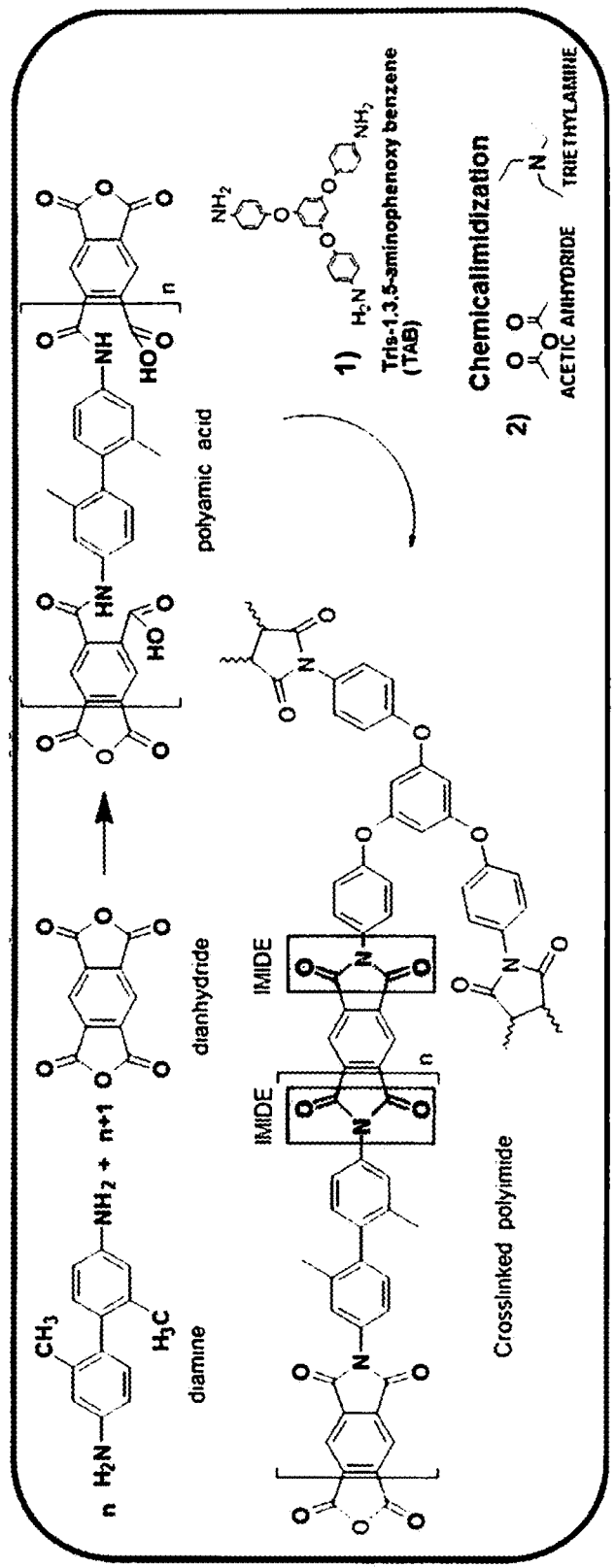
FIG. 1B illustrates a representation of an anhydride end-capped polyamic acid followed by addition of a multifunctional crosslinker and chemical imidization resulting in a polyimide chain with imide crosslinks, according to an embodiment of the present invention.
Figure 2D:
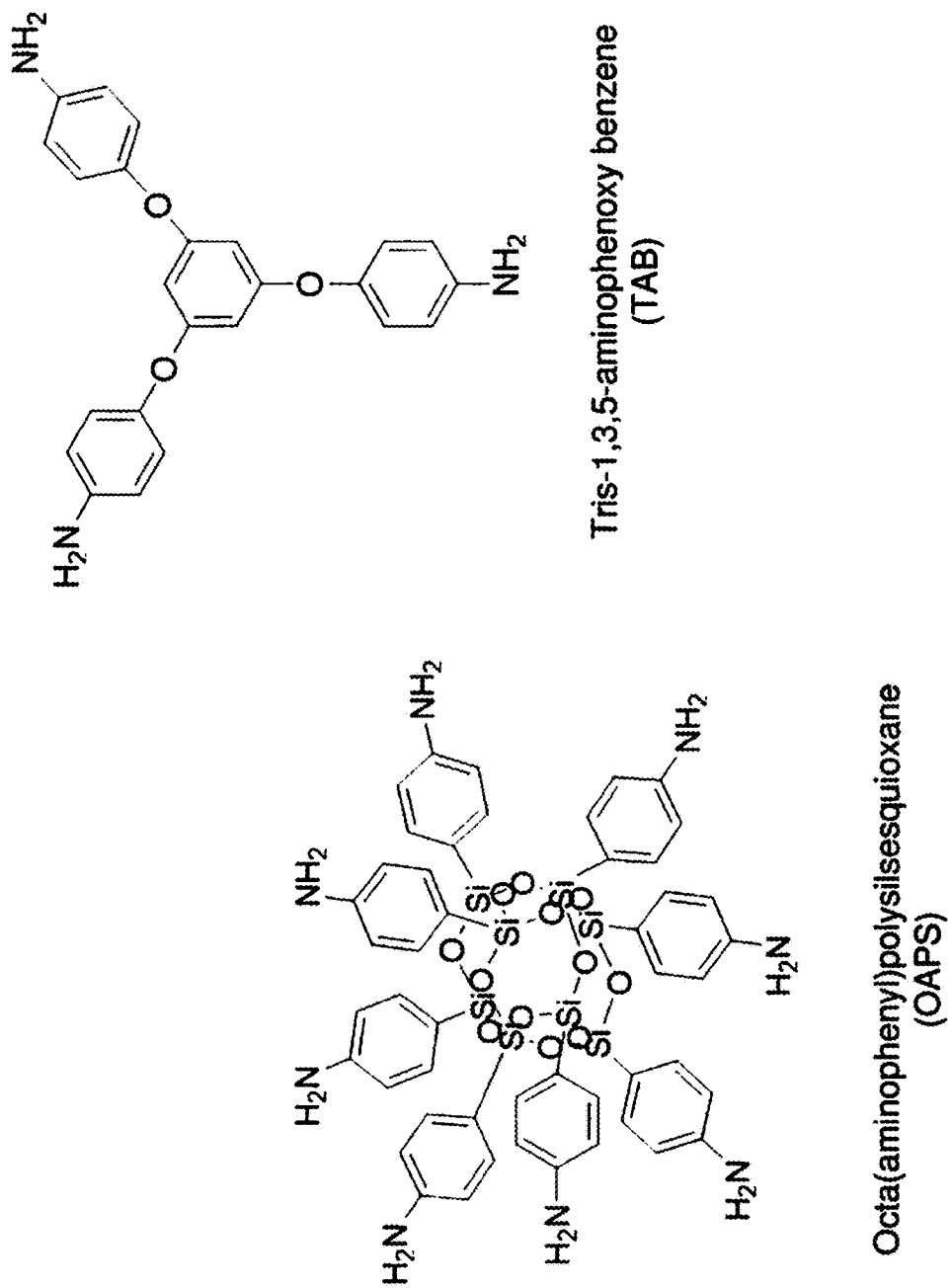
FIG. 2D illustrates anhydride end-capped crosslinkers that may be used to react with anhydride end-capped oligomers used, in part, to create polyimide aerogels, according to an embodiment of the present invention.

FIG. 1B depicts the synthetic mechanism of polyimide formation 110 with an amide crosslink using reactants at a ratio of n+1 dianhydride and n diamine at varying weigh percent. These monomers are dispersed in a high boiling point, aprotic solvent, such as NMP, to form a polyamic acid chain end-capped with anhydrides. This step is followed by addition of a multifunctional amine to crosslink the polyamic acid chains. These chains were then imidized chemically at room temperature using a water scavenger (acetic anhydride) and a base catalyst (triethylamine) as dehydrating agents to close the ring of the amic acid, forming the polyimide through a condensation polymerization, whereby 6(n+1) moles of water are produced.

It should be noted that various embodiments are possible without deviating from the scope of the invention. Polyimide aerogels of some embodiments include a polyimide oligomer component that includes a reaction product of at least one dianhydride, a multifunctional crosslinker connected to the polyimide component, and at least one diamine. The ratio of the at least one dianhydride to the at least one diamine is n to n+1, per the above.

This process is much more efficient and cost-effective for industry standards. The use of chemicals as an alternative to thermal imidization allows the process to occur at room temperatures for commencement of dehydration of the polyamic acid to form the polyimide. Of perhaps even greater interest is the extension of shelf life by amine end-capping, as opposed to anhydride end-capping prior to crosslinking. In addition, the use of BTC as a crosslinker is more cost-effective than the custom made or boutique monomers previously used. A wide range of monomers 200, 210, 220, 230 used in some embodiments are shown in FIGS. 2A-D.

Use of monomers consisting of dianhydrides (pyromellitic dianhydride (PMDA), 4,4'-(Hexafluoroisopropylidene) diphthalic anhydride (6FDA), Bicyclo[2.2.2]oct-7-ene-2,3,5,6-tetracarboxylic dianhydride (BCDA), 1,2,3,4-Cyclopentane tetracarboxylic dianhydride (CPDA), Cyclobutane-1,2,3,4-tetracarboxylic dianhydride (CBDA)), and diamines (2,2'-Dimethylbenzidine (DMBZ), 2,2'-Bis (trifluoromethyl) benzidine (22TFMB), 2,2-Bis [4-(4-aminophenoxy phenyl)] hexafluoropropane (HFBAPP), and 2,2-Bis (4-aminophenyl) hexafluoropropane (Bis-A-AF)) is considered herein with varying alkyl groups, fluorine moieties, and aliphatic and aromatic bridgehead components, as seen in dianhydrides 200, diamines 210, and crosslinkers 220, 230 in FIGS. 2A-D. The polyimides formed by using combinations of these diamines and dianhydrides were crosslinked with a triacid chloride (1,3,5-benzenetricarbonyl trichloride (BTC)), resulting in an amide bond to the polyimide backbone, as seen in FIG. 1A and tris-1,3,5-aminophenoxy benzene (TAB), resulting in an imide bond as seen in FIG. 1B. Additional crosslinkers include, but are not limited to, poly(isobutylene maleic anhydride) (PIMA), polyethylene maleic anhydride (PEMA), toluene-2,4,6-triyltriisocyanate (TTTC), methylidnetri-p-phenylene triisocyanate (MTPT), DESMODUR® N3300 A, and octa(aminophenyl)polysilsesquioxane (OAPS). Gel synthesis is followed by supercritical fluid extraction. These combinations are expected to create aerogels with improved optical translucency, higher surface area, diminished thermal transfer, and increased flexibility.

Formulations using fractions of these diamines and dianhydrides were created using an optimization study by experimental design using a three-variable factorial analysis. The software, Design Expert™ Version 9 available from STAT-EASE™, Inc., was used to create the empirical models. This systematic process was used to determine the relationships between three factors: (1) n value; (2) weight percent of polymer in solution; and (3) fraction of fluorinated monomer.

The three variables were chosen to better predict, or fine tune, the more desirable characteristics of aerogels, such as density, porosity, pore size, structural integrity, dielectric constant, optical transparency, and thermal transfer. It is expected that the tuned chain length will contribute to thermal and mechanical properties, such as onset of decomposition and flexibility, by controlling crosslink density. The lower amount of crosslinking may lead to more liberal movement of the polymer chains, therefore reducing stiffness. This, however, will also tend to reduce the usable temperature limit of the material. The variation of polymer weight percent in solution also affects skeletal density, having a direct influence on porosity and bulk density. These properties contribute to the materials thermal conductivity, dielectric constant, and optical translucency.

General Procedure for Aerogel Fabrication

In some embodiments, a viscous solution of monomers forming a polyimide gel is poured into molds designed by removing the tip of a polypropylene disposable syringe with the plunger expressed. Gelation of the precursors may occur over a 24-hour period, producing the stable gels, which are then extracted into clean solvent (NMP). This is followed with replacing the NMP in the gel with acetone at increasing ratios of NMP/acetone of 75/25, 50/50, and 25/75 until the gels are submerged in 100% acetone.

Supercritical Fluid Extraction

In some embodiments, the supercritical fluid extraction process is as follows. The gels are submerged in acetone while being loaded into a stainless steel vessel with a 3000 psi/100° C. rating. Once sealed, the vessel pressure is ramped to 78 bar (1131 psi) at room temperature (25° C.) while the vessel is filled with liquid $CO_2$. This temperature and pressure allow the system to stay in the subcritical range of $CO_2$ to remain a liquid. The gels soak in liquid $CO_2$ for 30 minutes, and then drain at a rate of 9 g/min until a calculated weight is reached that corresponds to the exchange of a full vessel of contaminated $CO_2$ for clean $CO_2$, and then repeats for approximately 4 cycles. The temperature is then increased to 35° C. with a maximum pressure of 90 bar, which produces supercritical $CO_2$ (73 bar, 32° C.). During this process, crossing phase boundaries is avoided and the interfacial interaction between the solvent and material is reduced, allowing the structure to maintain its three-dimensional integrity without pore collapse via surface tension or capillary force. Once the supercritical stage has been reached, the pressure is slowly decreased while maintaining the high temperature, and the $CO_2$ within the gels is replaced by air. The vessel is then opened to reveal the aerogel, which is then placed in a vacuum oven at 65° C. for 24 hours to remove any residual solvent.

Materials

A polyimide aerogel with polyamide crosslinks was synthesized from monomers in varying concentrations and fractions. All materials were used as received. Pyromellitic dianhydride (PMDA), 4, 4'-Hexafluoroisopropylidene diphthalic anhydride (6FDA), 2,2'-Dimethylbenzidine (DMBZ), 2,2'-Bis (trifluoromethyl) benzidine (22TFMB), 2,2-Bis (4-aminophenyl) hexafluoropropane (Bis-A-AF), and 2,2-Bis 14-(4-aminophenoxy phenyl)] hexafluoropropane (HF-BAPP) were used to prepare the polyamic acid. Triethylamine (TEA) and Acetic Anhydride (AA) were used as dehydrating agents for ring closure. 1, 3,5-benzenetricarbonyl trichloride (BTC) was used as a crosslinking agent for gelation of the three-dimensional backbone.

EXPERIMENTAL RESULTS

Tables 1A and 1B consists of data analysis results of properties resulting from the combination of the three variables used in the design of experiments for the polyimide aerogels.

TABLE 1A

POLYIMIDE AEROGEL ANALYSIS RESULTS (PART 1)

| Sample ID: | Repeat Unit (n): | Polymer Concentration (w/w %): | Fluorinated Fraction: | Shrinkage (%): |
|---|---|---|---|---|
| 1 | 60 | 7 | 0 | 8 |
| 2 | 60 | 10 | 0.5 | 20 |
| 3 | 60 | 8.5 | 0.25 | 21 |
| 4 | 40 | 10 | 0 | 10 |
| 5 | 60 | 10 | 0 | 11 |
| 6 | 50 | 8.5 | 0 | 9 |
| 7 | 50 | 8.5 | 0.25 | 14 |
| 8 | 40 | 8.5 | 0.25 | 20 |
| 9 | 50 | 8.5 | 0.25 | 21 |
| 10 | 60 | 7 | 0.5 | 12 |
| 11 | 50 | 10 | 0.25 | 19 |
| 12 | 50 | 7 | 0.25 | 17 |
| 13 | 50 | 8.5 | 0.25 | 21 |
| 14 | 50 | 8.5 | 0.5 | 10 |
| 15 | 40 | 7 | 0.5 | * |
| 16 | 40 | 7 | 0 | 7 |
| 17 | 50 | 8.5 | 0.25 | 21 |
| 18 | 40 | 10 | 0.5 | 14 |

TABLE 1B

POLYIMIDE AEROGEL ANALYSIS RESULTS (PART 2)

| Sample ID: | Density (g/cm³): | Skeletal Density (g/cm³): | Porosity (%): | TGA (° C): | Surface Area (m²/g) |
|---|---|---|---|---|---|
| 1 | 0.089 | 1.526 | 94 | 462 | 616 |
| 2 | 0.146 | 1.500 | 90 | 516 | 700 |
| 3 | 0.158 | 1.488 | 89 | 514 | 676 |
| 4 | 0.137 | 1.500 | 91 | 512 | 669 |
| 5 | 0.133 | 1.478 | 91 | 517 | 561 |
| 6 | 0.110 | 1.478 | 93 | 509 | 629 |
| 7 | 0.134 | 1.544 | 91 | 512 | 767 |
| 8 | 0.152 | 1.506 | 90 | 515 | 772 |
| 9 | 0.136 | 1.469 | 91 | 516 | 522 |
| 10 | 0.078 | 1.551 | 95 | 512 | 768 |
| 11 | 0.167 | 1.491 | 89 | 514 | 711 |
| 12 | 0.136 | 1.506 | 91 | 514 | * |
| 13 | 0.155 | 1.481 | 90 | 513 | 782 |
| 14 | 0.104 | 1.544 | 93 | 509 | 549 |
| 15 | * | * | * | * | 548 |
| 16 | 0.087 | 1.546 | 94 | 449 | 594 |
| 17 | 0.156 | 1.497 | 90 | 515 | 710 |
| 18 | 0.139 | 1.541 | 91 | 511 | 605 |

*Not measured

The n value, or degree of polymerization, varied at chain lengths equaling 40, 50, and 60 repeat units. The polymer weight percent was varied at 7, 85, and 10 w/w %. The fraction of fluorinated and non-fluorinated dianhydrides and diamines was varied at 0/100, 25/75, and 50/50, respectively.

Ratios of pyromellitic dianhydride (PMDA) to 4,4'-(hexafluoroisopropylidene) diphthalic anhydride (6FDA) were varied at 100/0, 75/25, and 50/50 at n repeat units with n+1 diamine (2,2'-dimethylbenzidene (DMBZ)). Polymer concentrations varied from 7-10 w/w % and n values ranged from 40-60. Use of 1,3,5-benzenetricarbonyl trichloride (BTC) was used as a crosslinker in all formulations at a stoichiometric amount of 2 moles BTC to 3 moles of the bifunctional polyimide oligomer.

Preparation of Polyimide without Fluorinated Fraction

The first formulation in Tables 1A and 1B (Sample 1), which does not include any fraction of 6FDA with n=60 and polymer concentration at 7%, was produced as follows. DMBZ (3.78 g, 17.8 mmol) was added to a solution of 89.47 ml NMP. This was stirred for approximately 15 minutes until the precursor was completely dissolved. To this solution, PMDA (2.27 g, 17.5 mmol) was added and stirred for 10 minutes until the dianhydride was completely dissolved. The acetic anhydride (13.25 ml) and triethylamine (2.44) were added to the polyamic acid to catalyze the imidization. This solution was stirred for approximately 15 minutes before adding the crosslinker. The BTC (0.052 g, 0.195 mmol) crosslinker, previously dissolved in 5 ml NMP, was added to the polymer solution, stirred for 1-2 minutes, and then poured into molds to gel. Gelation occurred within 45 minutes.

After 24 hours, the gels were extracted into a 75:25 ratio of NMP:acetone, followed by 50:50, 75:25, and 0:100 ratios at 24 hour cycles. The acetone saturated gels were then transferred to an autoclave, submerged in acetone, and sealed in a pressurized vessel. Liquid $CO_2$ is then introduced into the vessel to saturate the gels and aid in removal of the acetone. The gels are taken through a series of $CO_2$ rinsing and soaking at room temperature and pressure at 78 bar (1131 psi), which is below the critical point of $CO_2$. Once fully saturated and free of acetone, the vessel is raised to targeted pressures and temperatures (78 bar, 32° C.), whereby the gels go through supercritical fluid extraction to produce the aerogels.

Preparation of Polyimide with Fluorinated Fraction of Dianhydride

Sample 2 of Tables 1A and 1B consisted of equal fractions of 6FDA and PMDA at 10 wt % polymer and n=60. DMBZ (4.21 g, 19.8 mmol) was added to 82.55 ml NMP and stirred 15 minutes until dissolved. The 6FDA (4.33 g, 9.75 mmol) was added in small increments, very slowly over a 10-minute period. After stirring for 30 minutes to ensure complete reaction, the second fraction of dianhydride, PMDA (2.127 g, 9.75 mmol), was added and stirred for 10 minutes. To this solution, acetic anhydride (14.75 ml) and triethylamine (2.72 ml) were added to induce dehydration for ring closure producing the polyimide chain with amine endcaps. After 10 minutes, the BTC (0.058 g, 0.22 mmol), previously dissolved in 5 ml NMP, was added, stirred, and poured into molds. Gelation occurred within 2 hours. Final processing followed steps previously mentioned.

Preparation of Polyimide with Fluorinated Fraction of Diamine

Additional formulations not included in the table used fractions of fluorinated diamines as opposed to fluorinated dianhydrides. Variables remained the same at n=40-60, polymer w/w %=7-10, and fluorinated monomer fractions=0-50%. One example used a 50:50 ratio of a fluorinated diamine (2, 2'-Bis (trifluoromethyl) benzidine (22TFMB)) and a non-fluorinated diamine (DMBZ) at n=40 and 7 wt % with only PMDA as the dianhydride. To a solution of NMP (85.47 ml), 22TFMB (2.49 g, 7.79 mmol) was added and stirred for 20 minutes. After the diamine was completely dissolved, the dianhydride, PMDA (3.37 g, 15.45 mmol), was added and stirred for 30 minutes. This was followed by addition of the remaining diamine, DMBZ (1.65 g, 7.79 mmol), and stirred for 10 minutes until dissolved. Acetic anhydride (11.68 ml) and triethylamine (2.15 ml) were added to encourage chemical imidization. After 5 minutes of stirring, BTC (0.068 g, 0.26 mmol) previously dissolved in 5 ml NMP was poured into the solution, stirred for 2 minutes, and immediately poured into molds. Higher wt % formulations, such as 10 wt %, gel before the solution can be poured. This gel then follows the same procedure for solvent exchange and supercritical fluid extraction as previously mentioned. The final aerogel is then vacuum dried at 60° C. for 24 hours to produce aerogels with densities of 0.0701 g/cm$^3$, as well as very low haze (15.3), high transmission (84.8), and high clarity (99.4).

Results

Figure 3:
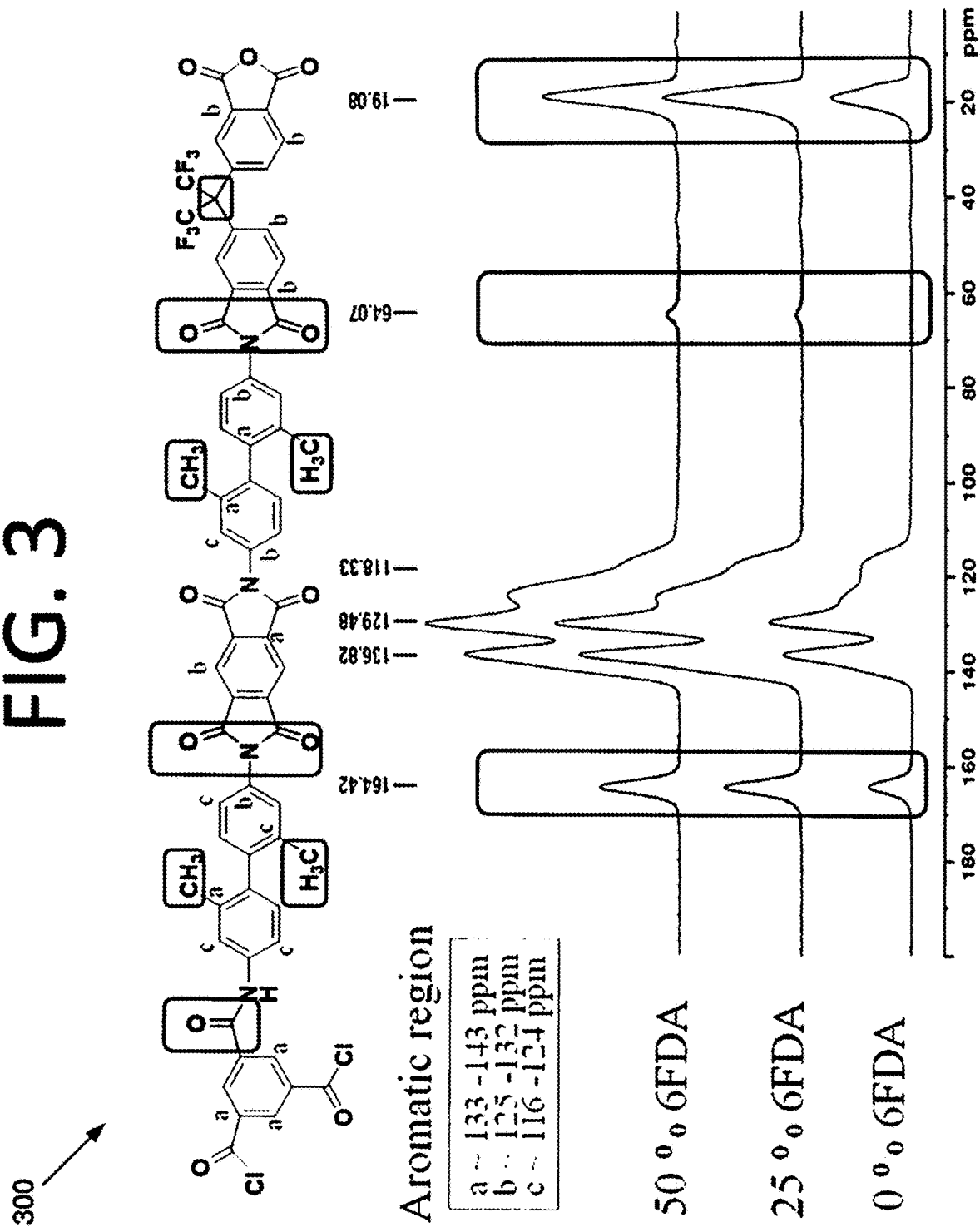
FIG. 3 illustrates solid state $^{13}C$ nuclear magnetic resonance (NMR) spectra of polyimide at increasing fractions of 6FDA, according to an embodiment of the present invention.

Spectra 300 of FIG. 3 are $^{13}$C nuclear magnetic resonance (NMR) spectra comparing polymers with varying fractions of fluorinated dianhydride concentrations. Spectra 300 confirm that imidization has occurred by the existence of the bands at 165 parts-per-million (ppm), which is representative of the imide carbonyl. The aromatic region is shown between 110-140 ppm, showing a slight change as the concentration of 6FDA is increased. At approximately 65 ppm, emergence of the carbon atom attached to the hexafluoro carbon group slightly masked by the carbons attached to the fluorine groups occurs, which results in a smaller peak intensity. The NMR spectra follow closely with results seen comparing various conditions using fluorinated monomers with PMDA in work performed by Ando et al. See S. Ando, T. Matsura, and S. Nishi, "$^{13}$C NMR Analysis of Fluorinated Polyimides and Poly (amic Acid)s," Polymer, Vol. 33, Issue 14, pp. 2934-2939 (1992).

Figure 4B:
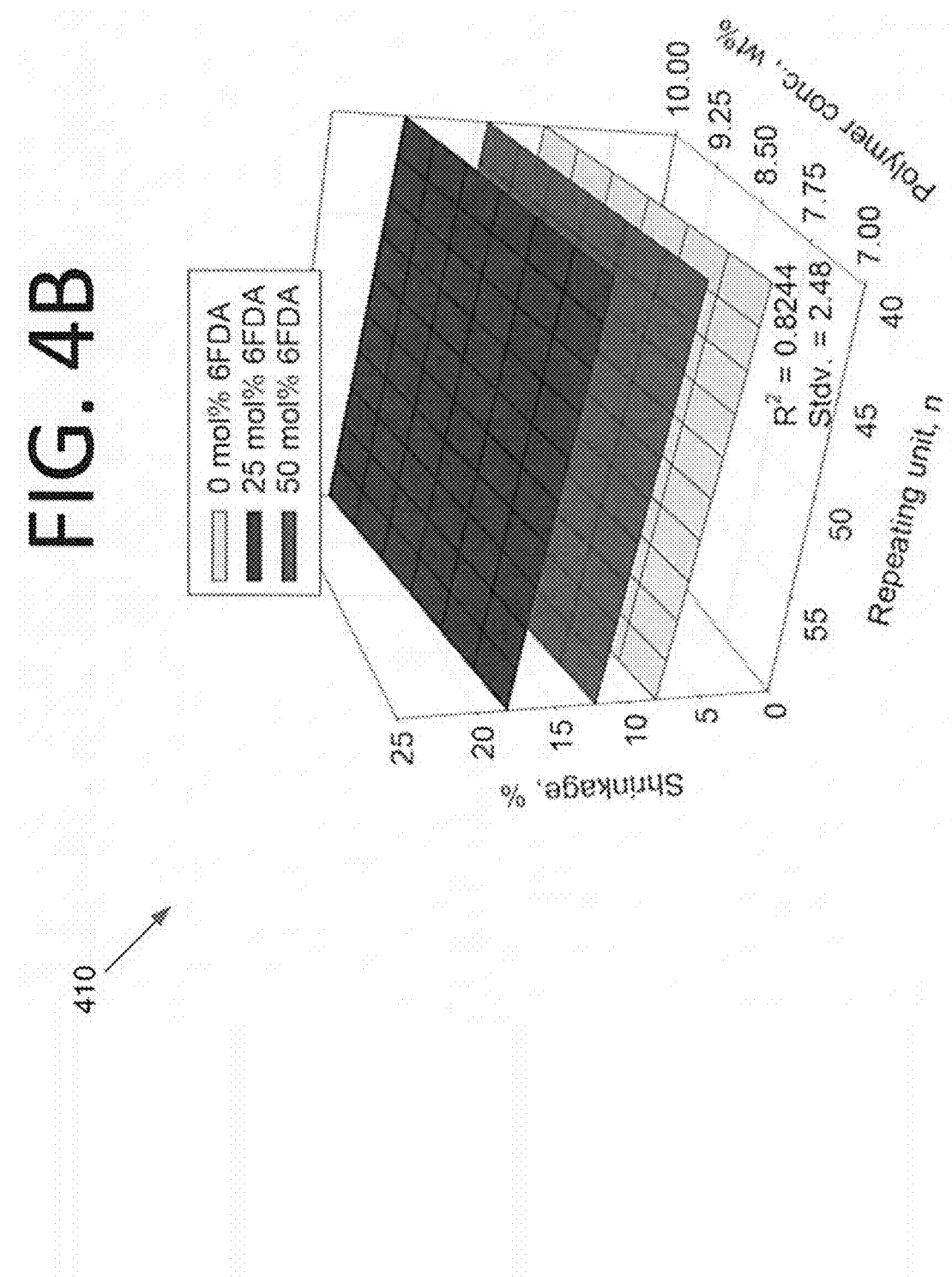

FIGS. 4A-C illustrate empirical models 400, 410, 420 comparing density, shrinkage, and porosity in relation to number of repeat units (n) and polymer concentration (wt %) of polyimide aerogel at varying fractions of 6FDA and PMDA with DMBZ. Depicted models 400, 410, 420 of the BTC cross-linked aerogels show a decrease in porosity and an increase in density and shrinkage for the 25 mol % 6FDA samples. The pure PMDA and 50/50 samples behaved more similarly in regard to density, shrinkage, and porosity.

As seen in empirical models 400, 410, 420 in FIGS. 4A-C derived from the data in Tables 1A and 1B, the chain length n seems to have little or no effect on shrinkage, density, or porosity. The polymer weight percent has only minimal effect on density, porosity, and shrinkage, however. As the fluorine decorated monomer fraction increases, the desirable characteristics such as shrinkage and density start to wane. On the other hand, somewhere between 25 mol % and 50 mol %, the reverse happens.

Figure 5:
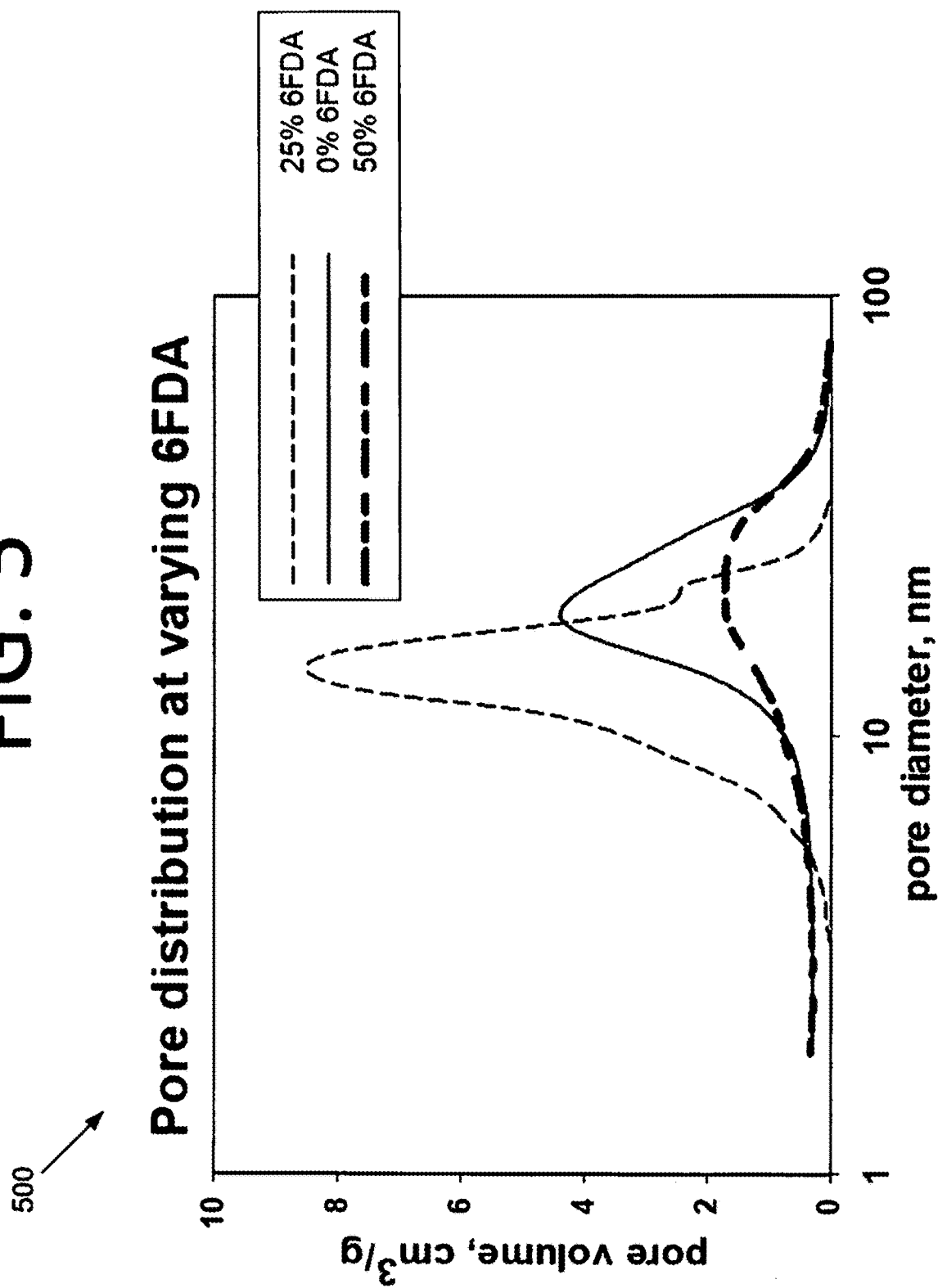
FIG. 5 is a graph illustrating pore distribution at varying fractions of 6FDA with PMD using DMBZ as the diamine and BTC as the crosslinker, according to an embodiment of the present invention.

The density and porosity can be expected to increase and decrease respectively in relation to the increased shrinkage in the samples at 25 mol %. However, it is unexpected that the structural change resulting from the fluorocarbon pendant on the dianhydride backbone would cause pore size distribution to narrow at 25%, and then start to widen dramatically at higher fractions of 6FDA, as seen graph 500 of FIG. 5. Previous work by Meador et al. used the BTC crosslinker with fractions of non-fluorinated dianhydrides and saw a steady increase or decrease in properties at increasing fractions, but not a saturation point, as exhibited using 6FDA. See Mary Ann B. Meador; C. R. Aleman, K. Hanson, N. Ramirez, Stephanie L. Vivod, N. Wilmoth, and L. McCorkle, "Polyimide Aerogels with Amide Cross-Links: A Low Cost Alternative for Mechanically Strong Polymer Aerogels," ACS Appl. Mater. Interfaces, Vol. 7, No. 2, pp. 1240-1249 (January 2015).

Figure 10:
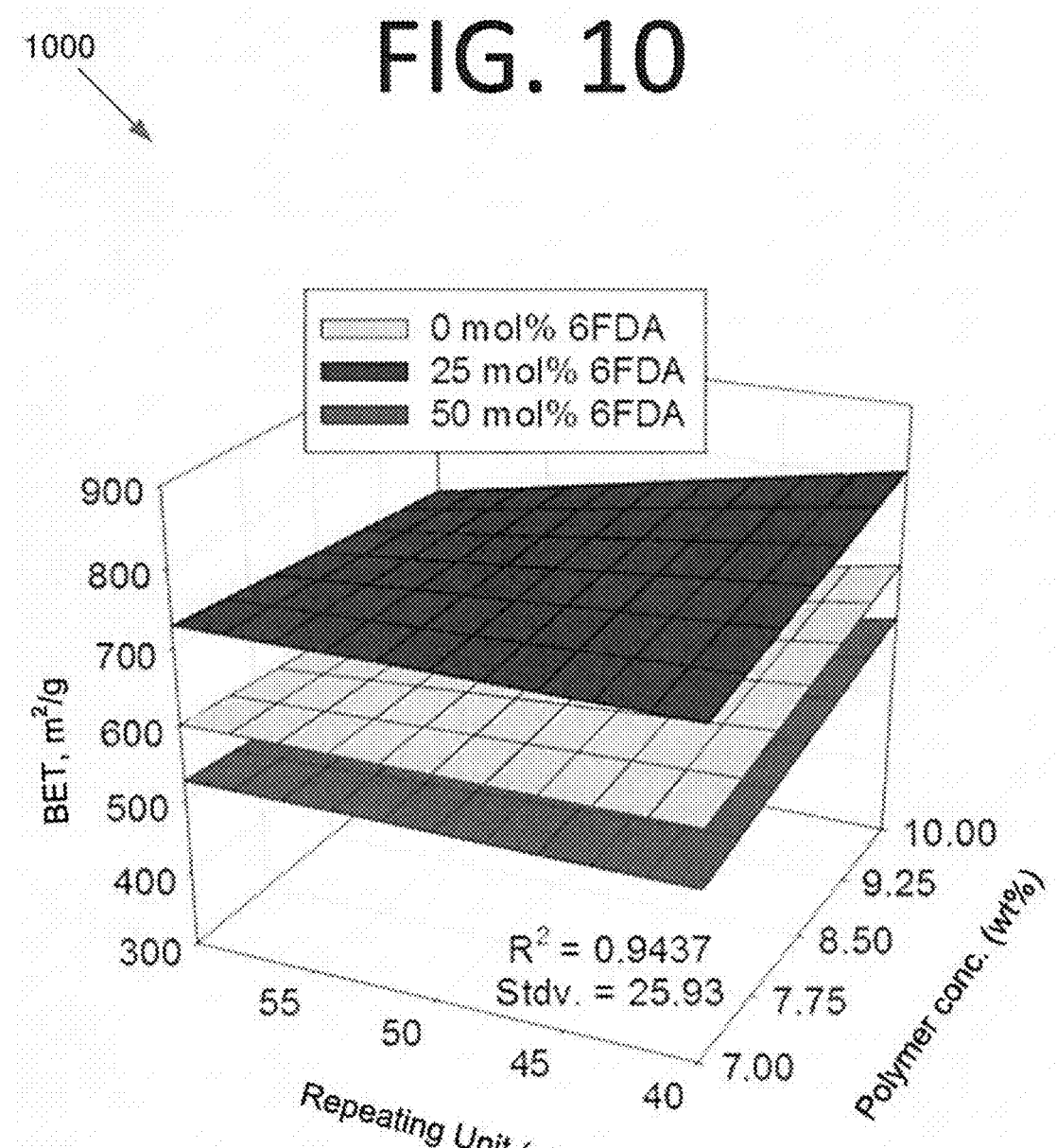
FIG. 10 is a graph illustrating surface areas determined by Brunauer-Emmet-Teller (BET) analysis in relation to crosslink density resulting from the n value of repeat units and polymer concentration at varying fractions of 6FDA, according to an embodiment of the present invention.

The narrow pore size distribution may be a result of the higher shrinkage seen in the samples containing 25% 6FDA. The pure PMDA results in a slightly stiffer structure with larger void spaces, but with a small addition of the bulky dianhydride, a portion of the backbone becomes less stiff. This section will be dominated by the rigid structure of the PMDA. This physically allows for some packing, causing the increase in shrinkage and the smaller pore sizes, but also lending to larger surface areas, as depicted in graph 1000 of FIG. 10. However, as the fluorinated dianhydride content is increased, the 6FDA will dominate the backbone by increasing the flexibility in the entire polymer chain, as well as creating steric hindrance with the hexafluoro moieties. This will force a structure with a wide range of large, open pores, thus reducing shrinkage and increasing porosity. This is demonstrated in the data provided in SEM images 600 of FIG. 6. More specifically, the top two images show the structure of 0% 6FDA at 500 nm (left) and 200 μm (right) magnification, which has a density of 0.137 g/cm$^3$, a porosity of 91%, shrinkage of 10.09%, and a surface area of 669 m$^2$/g. The middle two images show the structure of 25% 6FDA at 500 nm (left) and 200 μm (right) magnification, which has a density of 0.167 g/cm$^3$, a porosity of 89%, shrinkage of 18.74%, and a surface area of 769 m$^2$/g. The bottom two images show the structure of 50% 6FDA at 500 nm (left) and 200 μm (right) magnification, which has a density of 0.139 g/cm$^3$, a porosity of 91%, shrinkage of 14.11%, and a surface area of 605 m$^2$/g.

Figure 11A:
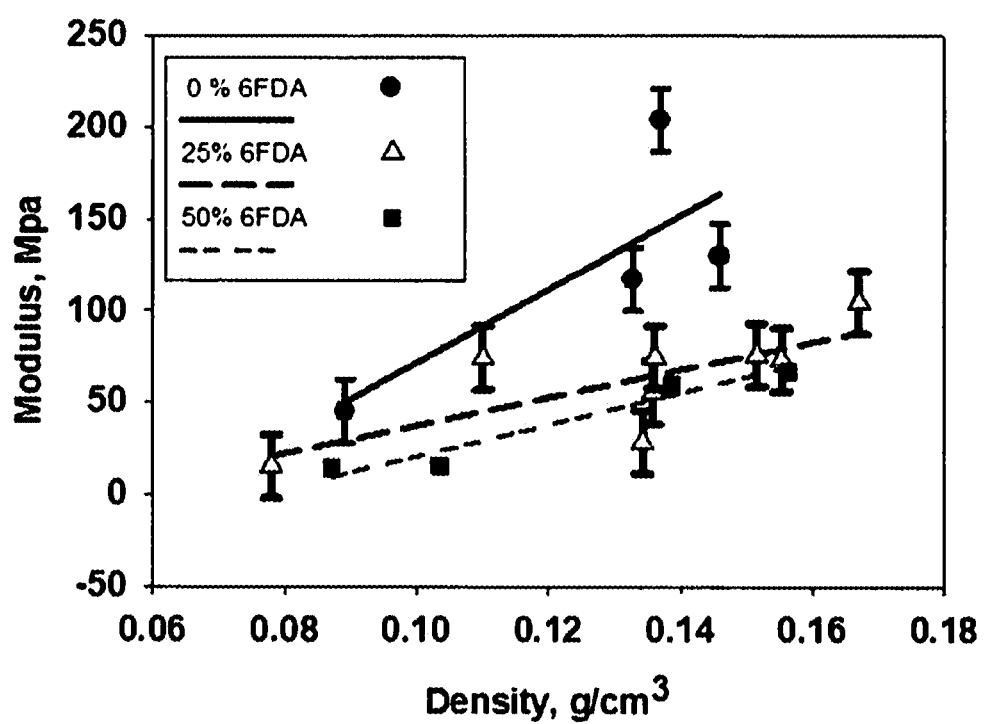
FIG. 11A is a graph illustrating fractions of 6FDA comparing modulus with respect to density, according to an embodiment of the present invention.
Figure 11B:
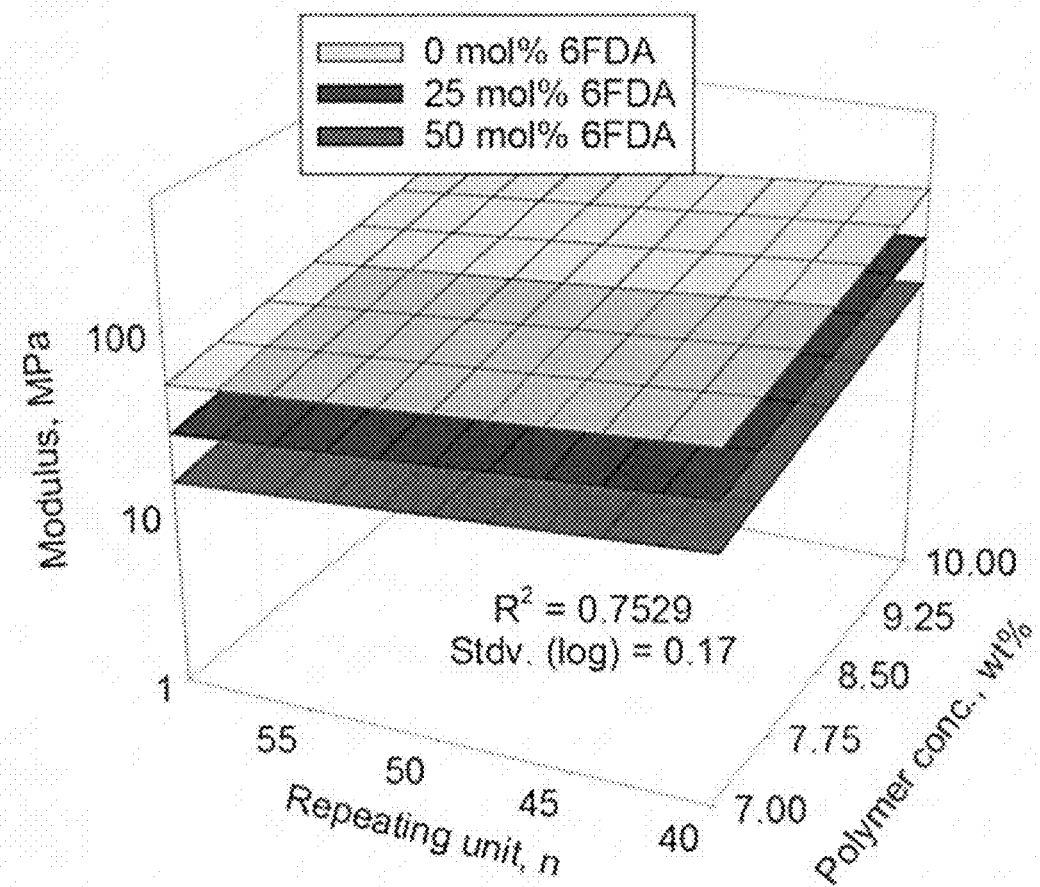
FIG. 11B is a graph illustrating fractions of 6FDA comparing modulus with respect to repeat unit and polymer concentration.

Examining SEM images 600 of FIG. 6, the change in structure is evident from 0% to 50% fraction of 6FDA. Although the 0% 6FDA, which represents pure PMDA, has similar properties to the 50% 6FDA, it is dramatically different in pore structure. The larger pore sizes and pore distribution result in desirable lower densities and higher porosities over all at the 0 and 50 wt % fractions. However, the 25 wt % gives much higher surface areas at smaller pore sizes and narrower distribution. This character may result in lower thermal conductivity and better optical translucency. In addition, it is expected that the shrinkage induced increase in density may lend to higher modulus and structural integrity. However, analysis reveals that as 6FDA increases in concentration, the modulus decreases. FIG. 4A depicts density in relation to polymer concentration and repeat unit at varying fractions of 6FDA. Density is highest at 25% 6FDA, but also has a dependency on polymer concentration. FIG. 11A shows a graph 1100 that compares moduli of fractions of 6FDA with respect to density and FIG. 11B shows a graph that compares moduli with respect to repeat unit and polymer concentration, both of which indicate that an increase in fluorine concentration will decrease modulus.

Figure 7:
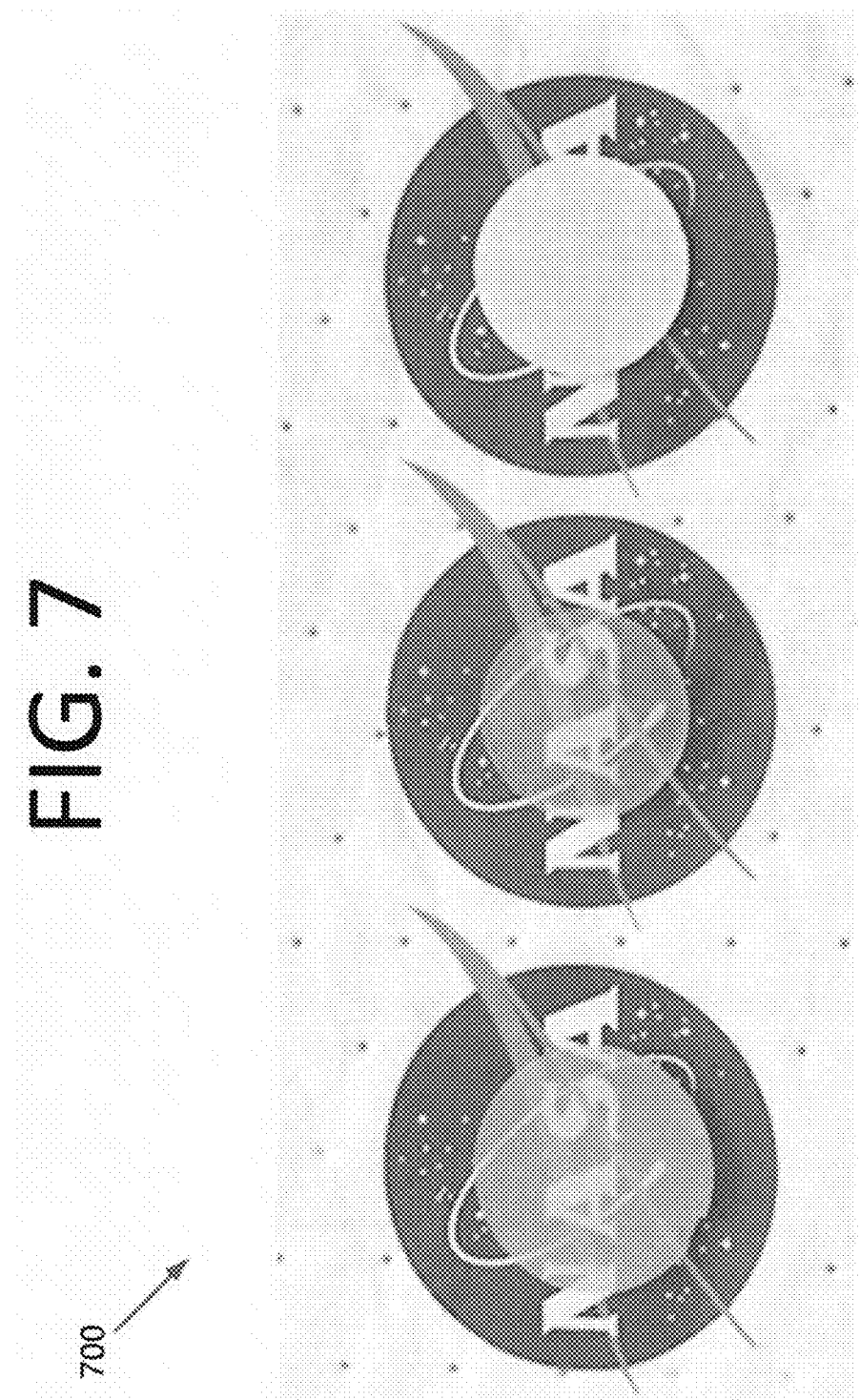
FIG. 7 is an image illustrating the visual opacity of polyimide aerogels with varying fractions of 6FDA, where from left to right, the percent of 6FDA in combination with PMDA went from 0% to 25% to 50%, respectively, according to an embodiment of the present invention.

The difference in opacity and shrinkage at varying fractions of 6FDA incorporation can be seen in images 700 of FIG. 7. This representation depicts the formulation with the 25% 6FDA fraction having the highest optical transparency. This is likely due to the higher shrinkage, which gives a smaller pore size and more uniform pore distribution, as seen previously in FIG. 5. However, from FIG. 6, it can also be seen that the mid-range of fluorinated addition also results in the highest surface area, which may be a contributing factor as well.

When testing haze, transmission, and clarity of the samples using varying fractions of fluorinated dianhydrides, the lowest haze also appeared at the 25% fraction. Table 2 below summarizes the optical properties with respect to fraction of fluorinated monomer. All samples were between 2.5 and 3 mm thick and were run on a Haze Gard Plus haze meter in accordance with ASTM Standard D-1003 "Test Method for Haze and Luminous Transmittance of Transparent Plastics".

TABLE 2

HAZE, TRANSMISSION, AND CLARITY AT VARYING 6FDA FRACTIONS

| Sample ID: | Fluorinated Fraction: | Haze: | Transmission: | Clarity: |
|---|---|---|---|---|
| 1 | 0 | 40 | 54 | 83 |
| 2 | 0.25 | 59 | 48 | 98 |
| 3 | 0.5 | 17 | 71 | 94 |
| 4 | 0 | 64 | 47 | 60 |
| 5 | 0 | 53 | 51 | 58 |
| 6 | 0 | 35 | 57 | 94 |
| 7 | 0.25 | 13 | 74 | 97 |
| 8 | 0.25 | 16 | 73 | 96 |
| 9 | 0.25 | 15 | 73 | 97 |
| 10 | 0.5 | 68 | 50 | 98 |
| 11 | 0.25 | 18 | 69 | 88 |
| 12 | 0.25 | 14 | 76 | 97 |
| 13 | 0.25 | 15 | 75 | 96 |
| 14 | 0.5 | 75 | 42 | 99 |
| 15 | 0.5 | 88 | 35 | 99 |
| 16 | 0 | 36 | 55 | 86 |
| 17 | 0.25 | 15 | 72 | 97 |
| 18 | 0.5 | 76 | 38 | 95 |

Using a 75 mm×100 mm×3 mm mold to produce the samples, the specimen surface is illuminated perpendicularly, and the transmitted light is measured photoelectrically, using an integrating sphere (0°/diffuse geometry). The spectral sensitivity conforms to CIE standard spectral value function y, under standard light C resp. A.

Figure 8A:
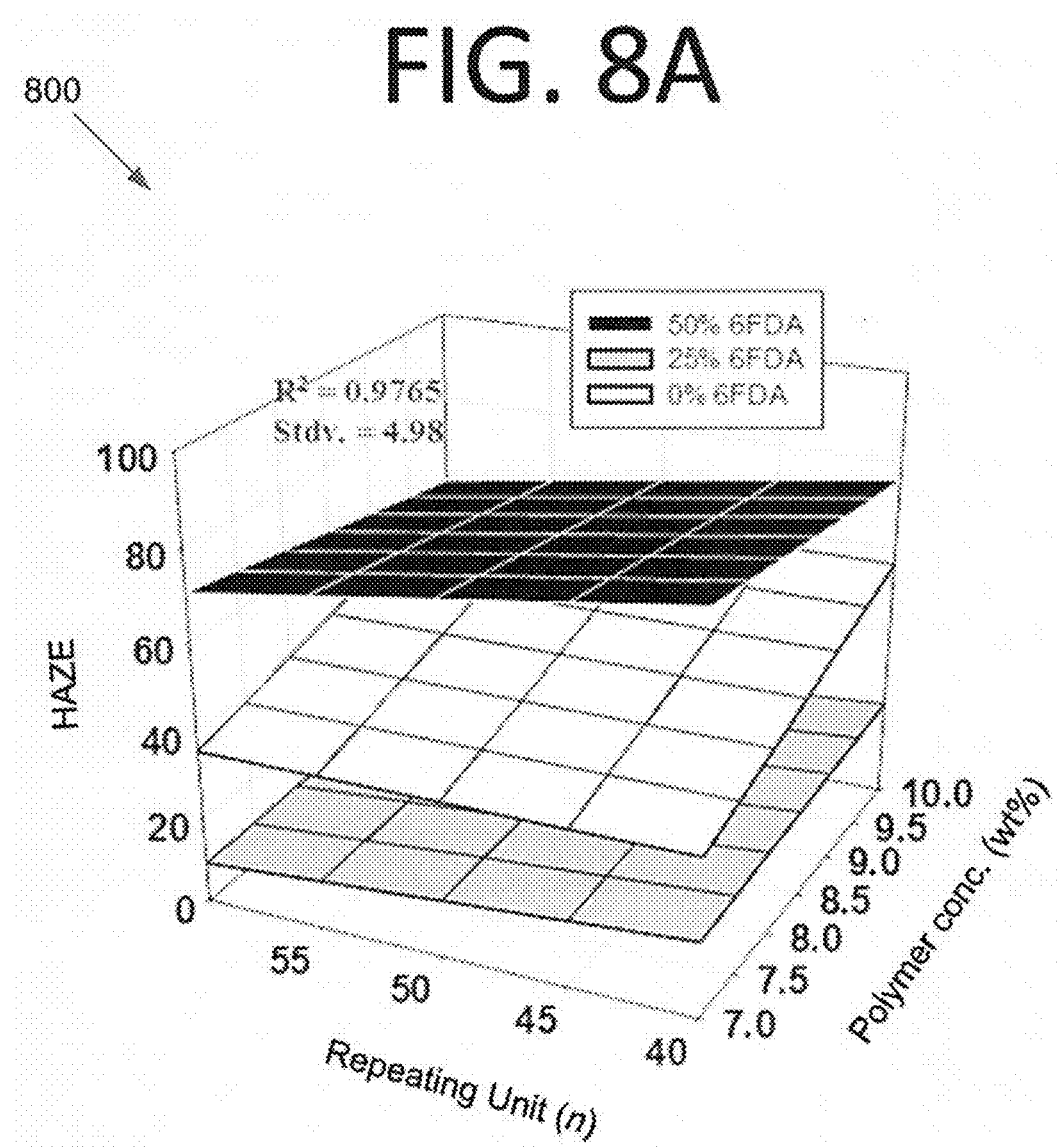
Figure 8C:
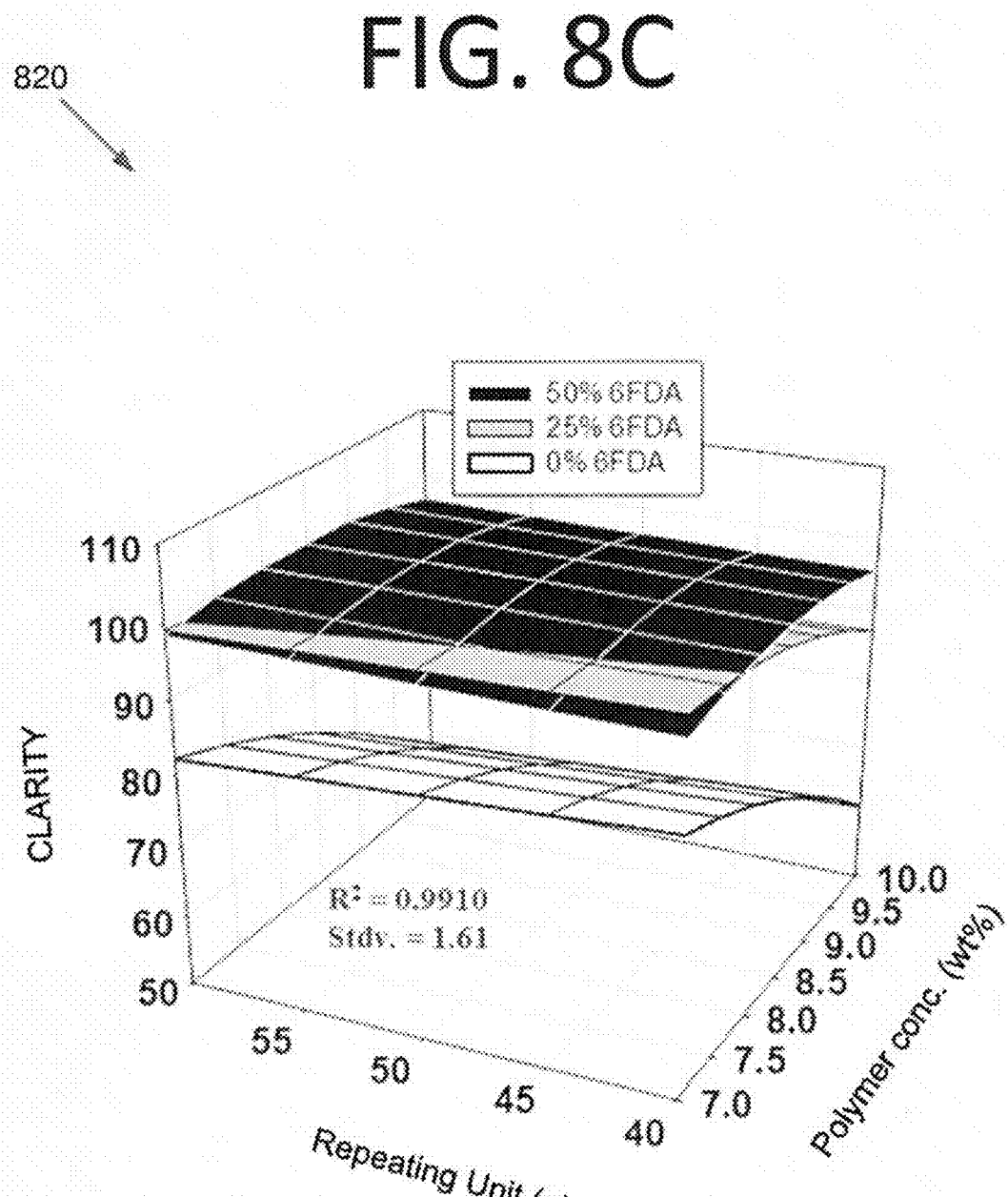

The fluorinated fraction has a definite positive effect on haze and transmission. The clarity tends to be above 90 for most samples. This data was modeled and graphed shown in graphs 800, 810, 820 of FIGS. 8A-C.

Graphs 800, 810, 820 represent the optical qualities of light through the material. However, color should also be taken into consideration due to it also being a component of scattered light. Transmittance consists of directly transmitted light and diffuse components. Haze, which is caused by wide angle scattering, shows a loss of contrast. Clarity is the see-through quality and is affected by narrow scattering.

Transmission—The amount of light that passes through the material without being scattered. This is the total of the incident light minus the absorbed and reflected light.

Haze—The amount of light that is subject to Wide Angle Scattering (At an angle greater than 2.5° from normal (ASTM D1003)). The light is diffused in all directions, which causes a loss of contrast.

Clarity—The amount of light that is subject to Narrow Area Scattering (At an angle less than 2.5° from normal). Light is diffused in a small angle range with high concentration affecting how well details are seen through the specimen.

As can be seen from the results presented herein, addition of fluorinated monomers (4, 4'-Hexafluoroisopropylidene diphthalic anhydride (6FDA)) has resulted in higher optical translucency and increased surface area. As such, large surface area, highly porous polyimide aerogels incorporating these fluorinated monomers may prove useful for various applications where at least some amount of visual transparency is desired. The resulting materials may maintain or exceed structural integrity and low thermal conductivity requirements seen in high opacity polyimide aerogels of similar porosity and density. Certain embodiments utilize sol-gel synthesis technology with aromatic and aliphatic dianhydrides and diamines as the precursors, in addition to a trifunctional acid chloride, that arrange in a self-assembled three-dimensional matrix that creates a low refractive index allowing for light penetration but not thermal transfer. While some embodiments have a yellow color, certain embodiments may be nearly or completely colorless.

Some embodiments may be used as ultralight insulation for space habitats (e.g., lunar or Mars habitats), allowing crew members to see through the material. Certain embodiments may be used as coatings that would scatter a laser. Such materials may be used on apparel without changing the outside appearance, adding insulation and could provide certain filtering. Opacity may be undesirable for such applications.

FIG. 9 is a flowchart 900 illustrating a process for creating transparent or semi-transparent polyimide aerogels, according to an embodiment of the present invention. The process begins with pouring a viscous solution of monomers forming a polyimide gel into molds at 905 designed by removing the tip of a polypropylene disposable syringe with the plunger expressed. Gelation of the precursors is allowed to occur over a 24-hour period at 910, producing the stable gels. The gels are then extracted into clean solvent (NMP) at 915. This is followed by replacing the NMP in the gel with acetone at increasing ratios of NMP/acetone of 75/25, 50/50, and 25/75 until the gels are submerged in 100% acetone at 920.

The saturated gels are then submerged in acetone while being loaded into a stainless steel vessel with a 3000 psi/100° C. rating at 925. Once sealed, the vessel pressure is ramped to 78 bar (1131 psi) at room temperature (25° C.) while the vessel is filled with liquid $CO_2$ at 930. This temperature and pressure allow the system to stay in the subcritical range of $CO_2$ to remain a liquid. The gels soak in liquid $CO_2$ for 30 minutes, and then drain at a rate of 9 g/min until a calculated weight is reached that corresponds to the exchange of a full vessel of contaminated $CO_2$ for clean $CO_2$, and then repeats for approximately 4 cycles at 935.

The temperature is then increased to 35° C. with a maximum pressure of 90 bar at 940, which produces supercritical $CO_2$ (73 bar, 32° C.). During this process, crossing phase boundaries is avoided and the interfacial interaction between the solvent and material is reduced, allowing the structure to maintain its three-dimensional integrity without pore collapse via surface tension or capillary force. Once the supercritical stage has been reached, the pressure is slowly decreased while maintaining the high temperature, and the $CO_2$ within the gels is replaced by air at 945. The vessel is then opened to reveal the aerogel at 950, which is then placed in a vacuum oven at 65° C. for 24 hours at 955 to remove any residual solvent.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A porous polyimide aerogel, comprising:
   a polyimide oligomer component comprising a reaction product of at least one dianhydride;
   a multifunctional crosslinker connected to the polyimide component; and
   at least one diamine, wherein
   a ratio of the at least one dianhydride to the at least one diamine is n to n+1, respectively, where n is a number of repeat units in the polyimide oligomer, and
   the porous polyimide aerogel is optically semi-transparent or transparent and
   wherein the at least one dianhydride further comprises Bicyclo[2.2.2]oct-7-ene-2,3,5,6-tetracarboxylic dianhydride (BCDA), 1,2,3,4-Cyclopentane tetracarboxylic dianhydride (CPDA), Cyclobutane-1,2,3,4-tetracarboxylic dianhydride (CBDA), or any combination thereof.

2. The porous polyimide aerogel of claim 1, wherein the crosslinker comprises a triacid chloride comprising 1, 3, 5-benzenetricarbonyl trichloride (BTC).

3. The porous polyimide aerogel of claim 1, wherein the at least one dianhydride comprises a fluorinated dianhydride.

4. The porous polyimide aerogel of claim 3, wherein the fluorinated dianhydride comprises 4, 4'-Hexafluoroisopropylidene diphthalic anhydride (6FDA).

5. The porous polyimide aerogel of claim 3, wherein the at least one dianhydride further comprises a non-fluorinated dianhydride.

6. The porous polyimide aerogel of claim 5, wherein a molar ratio of the fluorinated dianhydride to the non-fluorinated dianhydride is approximately 25/75.

7. The porous polyimide aerogel of claim 5 wherein the non-fluorinated dianhydride comprises pyromellitic dianhydride (PMDA).

8. The porous polyimide aerogel of claim 1, wherein n is in a range of n=40 to n=60.

9. The porous polyimide aerogel of claim 1, wherein the at least one diamine comprises 2,2'-Dimethylbenzidine (DMBZ), 2,2'-Bis (trifluoromethyl) benzidine (22TFMB), 2,2-Bis (4-aminophenyl) hexafluoropropane (Bis-A-AF), 2,2-Bis [4-(4-aminophenoxy phenyl)] hexafluoropropane (HFBAPP), or any combination thereof.

10. A porous polyimide aerogel, comprising:
    a plurality of dianhydrides comprising a fluorinated dianhydride and a non-fluorinated dianhydride;
    at least one diamine; and
    a crosslinker that provides a bond to a polyimide backbone and encourages gelation, wherein
    the porous polyimide aerogel is optically semi-transparent or transparent and wherein the plurality of dianhydrides further comprises Bicyclo[2.2.2]oct-7-ene-2,3,5,6-tetracarboxylic dianhydride (BCDA), 1,2,3,4-Cyclopentane tetracarboxylic dianhydride (CPDA), Cyclobutane-1,2,3,4-tetracarboxylic dianhydride (CBDA), or any combination thereof.

11. The porous polyimide aerogel of claim 10, wherein the crosslinker comprises a triacid chloride comprising 1, 3, 5-benzenetricarbonyl trichloride (BTC);
    the fluorinated dianhydride comprises 4, 4'-Hexafluoroisopropylidene diphthalic anhydride (6FDA); and
    the non-fluorinated dianhydride comprises pyromellitic dianhydride (PMDA).

12. The porous polyimide aerogel of claim 10, wherein a molar ratio of the fluorinated dianhydride to the non-fluorinated dianhydride is approximately 25/75.

13. The porous polyimide aerogel of claim 10, wherein
- a ratio of the plurality of dianhydrides to the at least one diamine is n to n+1, respectively, where n is a number of repeat units, and
- n is in a range of n=40 to n=60.

14. The porous polyimide aerogel of claim 10, wherein the at least one diamine comprises 2,2'-Dimethylbenzidine (DMBZ), 2,2'-Bis (trifluoromethyl) benzidine (22TFMB), 2,2-Bis (4-aminophenyl) hexafluoropropane (Bis-A-AF), 2,2-Bis [4-(4-aminophenoxy phenyl)] hexafluoropropane (HFBAPP), or any combination thereof.

15. A crosslinked polyimide polyamide, comprising:
- a plurality of dianhydrides comprising 4, 4'-Hexafluoroisopropylidene diphthalic anhydride (6FDA) and pyromellitic dianhydride (PMDA);
- at least one diamine; and
- a triacid chloride crosslinker comprising I, 3, 5-benzenetricarbonyl trichloride (BTC) that provides an amide bond to a polyimide backbone and encourages gelation, wherein
- the crosslinked polyimide polyamide is optically semi-transparent or transparent, and wherein a molar ratio of the 6FDA to the PMDA is approximately 25/75.

16. The crosslinked polyimide polyamide of claim 15, wherein
- a ratio of the plurality of dianhydrides to the at least one diamine is n to n+1, respectively, where n is a number of repeat units, and
- n is in a range of n=40 to n=60.

17. The crosslinked polyimide polyamide of claim 15, wherein the at least one diamine comprises 2,2'-Dimethylbenzidine (DMBZ), 2,2'-Bis (trifluoromethyl) benzidine (22TFMB), 2,2-Bis (4-aminophenyl) hexafluoropropane (Bis-A-AF), 2,2-Bis [4-(4-aminophenoxy phenyl)] hexafluoropropane (HFBAPP), or any combination thereof.

* * * * *